US011178698B2

(12) United States Patent
Liberg et al.

(10) Patent No.: US 11,178,698 B2
(45) Date of Patent: Nov. 16, 2021

(54) POWER CONTROL OF RANDOM ACCESS IN NB-IOT

(71) Applicant: Telefonaktiebolaget LM Ericsson (publ), Stockholm (SE)

(72) Inventors: Olof Liberg, Stockholm (SE); Andreas Höglund, Solna (SE); Yutao Sui, Solna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 162 days.

(21) Appl. No.: 16/610,555

(22) PCT Filed: May 31, 2018

(86) PCT No.: PCT/SE2018/050554
§ 371 (c)(1),
(2) Date: Nov. 4, 2019

(87) PCT Pub. No.: WO2018/222123
PCT Pub. Date: Dec. 6, 2018

(65) Prior Publication Data
US 2020/0359419 A1    Nov. 12, 2020

Related U.S. Application Data

(60) Provisional application No. 62/513,433, filed on May 31, 2017.

(51) Int. Cl.
*H04W 74/08* (2009.01)
*H04W 52/14* (2009.01)
(Continued)

(52) U.S. Cl.
CPC ..... *H04W 74/0833* (2013.01); *H04W 52/143* (2013.01); *H04W 52/242* (2013.01);
(Continued)

(58) Field of Classification Search
None
See application file for complete search history.

(56) References Cited

U.S. PATENT DOCUMENTS

2015/0016312 A1* 1/2015 Li ................. H04W 74/006
370/280
2016/0295609 A1* 10/2016 Vajapeyam ....... H04W 74/0833
(Continued)

OTHER PUBLICATIONS

Huawei et al., "On Uplink Power Control for Rel-13 NB-IoT", 3GP TSG RAN1 Meeting #89, Hangzhou, China, May 15, 2017, pp. 1-6, R1-1709672, Huawei.
(Continued)

*Primary Examiner* — Mohammad S Adhami
(74) *Attorney, Agent, or Firm* — Coats & Bennett, PLLC

(57) ABSTRACT

Techniques for performing random access in a wireless communication system are presented. For instance, the present disclosure includes an example method that includes determining a transmission power with which the UE (102) is to transmit a random access preamble while operating within a certain coverage enhancement level. In some examples, the transmission power is determined as a function of a target receive power with which the random access preamble transmission is targeted to be received by a network node (106), and a path loss between the UE (102) and a network node (106). In addition, the method includes transmitting the random access preamble using the determined transmission power while operating within the certain coverage enhancement level. The method also includes determining another transmission power with which the UE (102) is to transmit a connection request in the random access procedure, where the other transmission power is determined as a function of the target receive power with which the random access preamble transmission was targeted to be received. The method also includes transmitting
(Continued)

the connection request using the determined other transmission power. Related devices, processor and memory arrangements, methods, and computer programs are also presented.

12 Claims, 19 Drawing Sheets

(51) Int. Cl.
  *H04W 52/24* (2009.01)
  *H04W 52/36* (2009.01)
  *H04W 72/04* (2009.01)
  *H04W 80/02* (2009.01)
(52) U.S. Cl.
  CPC ....... *H04W 52/245* (2013.01); *H04W 52/365* (2013.01); *H04W 72/0473* (2013.01); *H04W 80/02* (2013.01)

(56) References Cited

U.S. PATENT DOCUMENTS

| | | | | |
|---|---|---|---|---|
| 2017/0280481 | A1* | 9/2017 | Stern-Berkowitz | ............................ H04W 74/0833 |
| 2018/0176847 | A1* | 6/2018 | Fasil Abdul | ......... H04J 11/0093 |
| 2018/0324850 | A1* | 11/2018 | Amuru | .................. H04L 5/0053 |
| 2019/0174434 | A1* | 6/2019 | Koskinen | ............ H04W 52/367 |
| 2019/0222969 | A1* | 7/2019 | Fujishiro | ................ H04W 4/06 |
| 2019/0281633 | A1* | 9/2019 | Ahn | ...................... H04W 52/36 |

OTHER PUBLICATIONS

Ericsson, "On Improved Random Access Procedure for Rel-14 NB-IoT", 3GPP TSG RAN WG1 #91, Reno, US, Nov. 27, 2017, pp. 1-7, R1-1719708, 3GPP.

3rd Generation Partnership Project, "3rd Generation Partnership Project; Technical Specification Group Radio Access Network; Evolved Universal Terrestrial Radio Access (E-UTRA); Physical Layer Procedures (Release 14)", Technical Specification, 3GPP TS 36.213 V14.2.0, Mar. 1, 2017, pp. 385-441, 3GPP.

3rd Generation Partnership Project, "3rd Generation Partnership Project; Technical Specification Group Radio Access Network; Evolved Universal Terrestrial Radio Access (E-UTRA); Medium Access Control (MAC) Protocol Specification (Release 14)", Technical Specification, 3GPP TS 36.321 V14.2.1, Mar. 1, 2017, pp. 1-106, 3GPP.

Webb, M. et al. , "Re: [89-01] On uplink power control for Rel-13 NB-IoT", 3GPP_TSG_RAN_WG1 Archives, email discussion, May 31, 2017, pp. 1-10, obtained on Nov. 12, 2019, obtained from internet: https://list.etsi.org/scripts/wa.exe?A2=3GPP_TSG_RAN_WG1;8e77b58.1705E.

\* cited by examiner

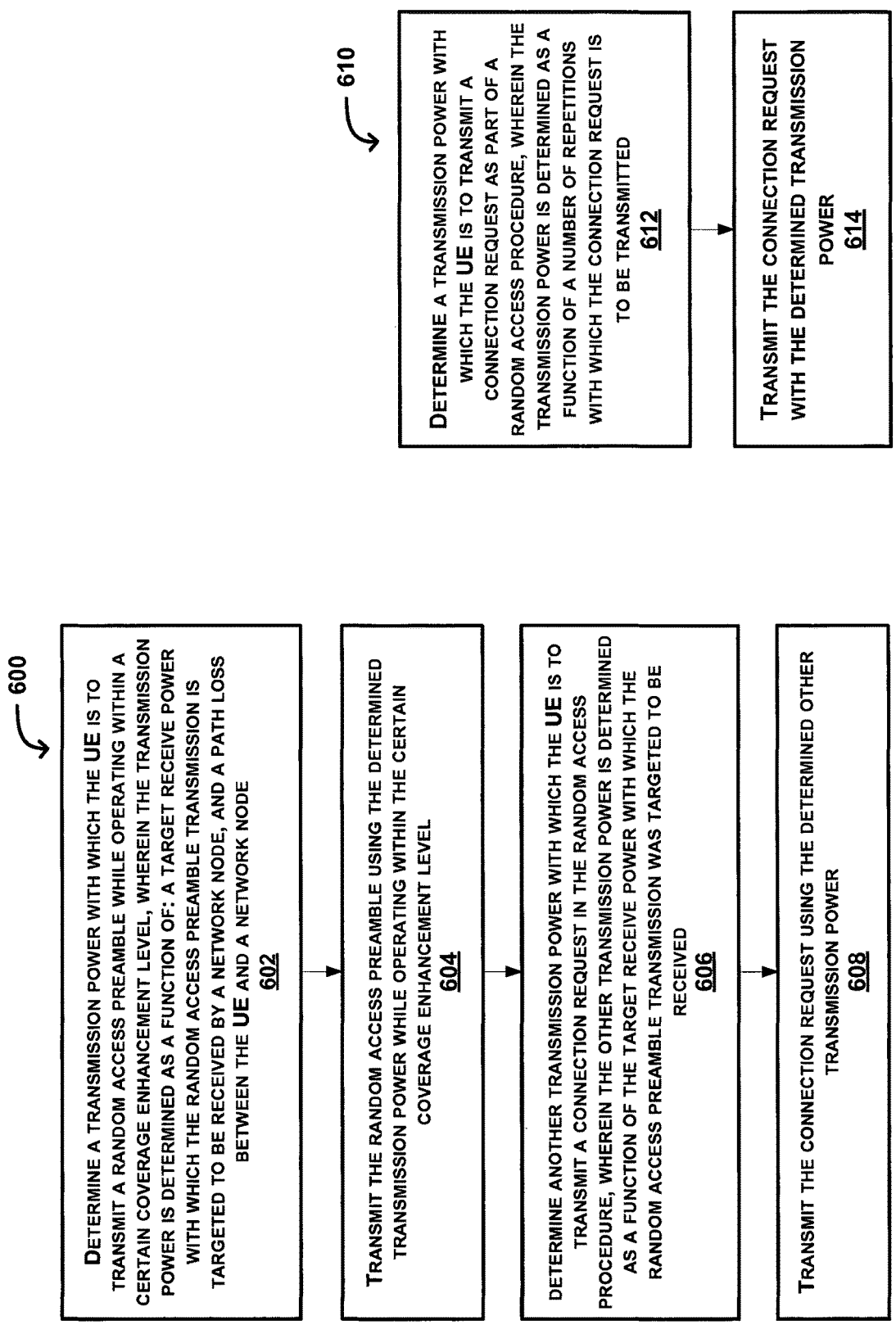

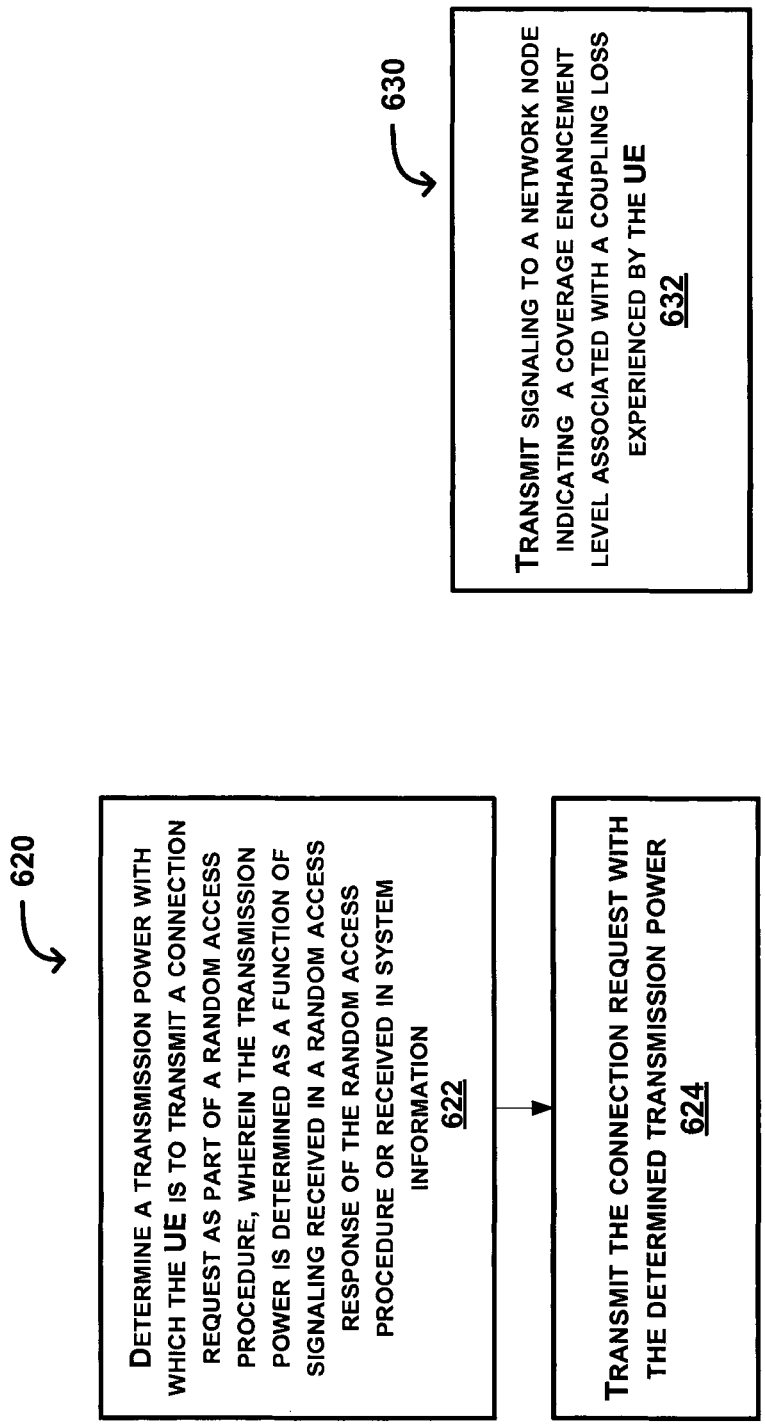

POWER CONTROL OF RANDOM ACCESS IN NB-IOT

CROSS-REFERENCE TO RELATED APPLICATION

The present application claims right of priority to U.S. Provisional Application No. 62/513,433, filed May 31, 2017, entitled "Power Control of Random Access in NB-IOT," the entirety of which is incorporated by reference.

TECHNICAL FIELD

The present application relates to methods and apparatus for controlling transmission power for random access transmissions in wireless communication systems, such as those systems that implement Narrow Band Internet-of-Things (NB-IoT) functionality.

BACKGROUND

In Release 13 (Rel-13), the Third Generation Partnership Project (3GPP) began to develop standards related to the implementation of Narrow-Band Internet-of-Things (NB-IoT). This new radio access technology is dedicated to providing connectivity to services and applications—and demanding low device complexity and optimized power consumption while still delivering reliable indoor coverage and high communication capacity. To achieve these goals, many aspects of traditional wireless access techniques have been revisited as possible candidates for improvement.

One of these aspects that have been reconsidered is the set of procedures for performing random access for user equipment (UE). Though improved random access procedures have already been proposed for continued improvement of NB-IoT, these proposed implementations suffer from several issues related to transmission power of uplink random access message transmissions by UEs. Currently, these transmission powers can be based, at least in part, on a coverage enhancement (CE) level associated with the UE. This paradigm, however, can lead to transmission powers that are higher than necessary, which can introduce unnecessary interference into the system, degrading medium access and efficiency for transmissions from other UEs (or network nodes such as gNBs, eNBs, and the like) on shared channels.

Accordingly, improvements are necessary for determining transmission power levels for certain random access transmissions in NB-IoT systems.

SUMMARY

The present disclosure presents a flexible uplink (UL) transmission power scheme to allow for improved network and UE operation in extended coverage without unnecessary radio resource consumption and the negative repercussions of overly high transmission power levels, thereby improving overall wireless system performance and individual uplink channel budget.

For instance, the present disclosure describes an example method performed by a UE or performing random access in a wireless communication system, the method including, for instance, determining a transmission power with which the UE is to transmit a random access preamble while operating within a certain coverage enhancement level. In such an example, the transmission power is determined as a function of a target receive power with which the random access preamble transmission is targeted to be received by a network node, and a path loss between the UE and a network node. The method can also include transmitting the random access preamble using the determined transmission power while operating within the certain coverage enhancement level. Furthermore, the example method can include determining another transmission power with which the UE is to transmit a connection request in the random access procedure, wherein the other transmission power is determined as a function of the target receive power with which the random access preamble transmission was targeted to be received. In addition, the example method can include transmitting the connection request using the determined other transmission power.

In a further feature, the disclosure introduces another example method performed by a UE for performing random access in a wireless communication system. This example method can include determining a transmission power with which the UE is to transmit a connection request as part of a random access procedure, where the transmission power is determined as a function of a number of repetitions with which the connection request is to be transmitted. In addition, the example method can include transmitting the connection request with the determined transmission power.

Furthermore, the present disclosure describes another example method performed by a UE for performing random access in a wireless communication system, this example method including determining a transmission power with which the UE is to transmit a connection request as part of a random access procedure, where the transmission power is determined as a function of signaling received in a random access response of the random access procedure or received in system information. This example method also including transmitting the connection request with the determined transmission power. In an additional example method presented by the present disclosure, again performed by a UE in a wireless communication system, can include transmitting signaling to a network node indicating a coverage enhancement level associated with a coupling loss experienced by the UE.

A further example presented in the disclosure is a method performed by a UE in a wireless communication system, whereby, responsive to a failed random access attempt, transmitting signaling to a network node indicating ramping of a coverage enhancement level used by the UE for random access.

In another example method performed by a UE in a wireless communication system, a UE can transmit a message to a network node at a transmission power level, where the message includes an indication of a power headroom table utilized by the UE for determining the transmission power level.

In addition, the present disclosure describes an example UE for performing random access in a wireless communication system. The example UE is configured to determine a transmission power with which the UE is to transmit a random access preamble while operating within a certain coverage enhancement level. In addition, the transmission power can be determined as a function of a target receive power with which the random access preamble transmission is targeted to be received by a network node, and a path loss between the UE and a network node. In addition, the example UE can be configured to transmit the random access preamble using the determined transmission power while operating within the certain coverage enhancement level. The UE is additionally configured to determine another transmission power with which the UE is to transmit a connection request in the random access procedure, where the other transmission power is determined as a function of the target receive power with which the random access preamble transmission was targeted to be received. Furthermore, the example UE can be configured to transmit the connection request using the determined other transmission power.

Likewise, another example UE is presented that includes a processor communicatively coupled to a memory. In an aspect, the memory stores processor-executable instructions that when executed by the processor, cause the UE to determine a transmission power with which the UE is to transmit a random access preamble while operating within a certain coverage enhancement level. In an aspect, the transmission power is determined as a function of a target receive power with which the random access preamble transmission is targeted to be received by a network node, and a path loss between the UE and a network node. The processor-executable instructions, when executed by the processor, additionally cause the UE to transmit the random access preamble using the determined transmission power while operating within the certain coverage enhancement level. In addition, the processor-executable instructions that when executed by the processor, cause the UE to determine another transmission power with which the UE is to transmit a connection request in the random access procedure, where the other transmission power is determined as a function of the target receive power with which the random access preamble transmission was targeted to be received. In an additional aspect, the processor-executable instructions, when executed by the processor, cause the UE to transmit the connection request using the determined other transmission power.

Further to the methods and apparatus embodiments on the UE side presented in the present disclosure, the disclosure includes network-side aspects as well. For instance, a method performed by network node in a wireless communication system is presented, which includes receiving signaling from a UE indicating ramping of a coverage enhancement level used by a UE for random access. In addition, the example method includes, based on the received signaling, determining a repetition level, a power level, and/or one or more parameters to be utilized for computing the power level to be used by the UE for transmission of a random access message. A network node configured to perform the aspects of such an example method is also described.

Likewise, a corresponding network node is presented that includes a processor communicatively coupled to a memory, the memory storing processor-executable instructions that when executed by the processor, cause the network node to receive signaling from a UE indicating ramping of a coverage enhancement level used by a UE for random access, and in addition, based on the received signaling, determine a repetition level, a power level, and/or one or more parameters to be utilized for computing the power level to be used by the UE for transmission of a random access message.

Furthermore, a computer program is described that includes instructions which, when executed by at least one processor of a UE, causes the UE to determine a transmission power with which the UE is to transmit a random access preamble while operating within a certain coverage enhancement level, where the transmission power is determined as a function of a target receive power with which the random access preamble transmission is targeted to be received by a network node, and a path loss between the UE and a network node. The computer program likewise includes instructions which, when executed by the at least one processor of a UE, causes the UE to transmit the random access preamble using the determined transmission power while operating within the certain coverage enhancement level. In addition, the example computer program includes instructions which, when executed by the at least one processor of a UE, causes the UE to determine another transmission power with which the UE is to transmit a connection request in the random access procedure, where the other transmission power is determined as a function of the target receive power with which the random access preamble transmission was targeted to be received, and to transmit the connection request using the determined other transmission power.

Also described in the present disclosure is a computer program that includes instructions which, when executed by at least one processor of a network node, cause the network node to receive signaling from a UE indicating ramping of a coverage enhancement level used by a UE for random access, and based on the received signaling, determine a repetition level, a power level, and/or one or more parameters to be utilized for computing the power level to be used by the UE for transmission of a random access message.

These and additional example embodiments will now be described in reference to the figures that follow.

BRIEF DESCRIPTION OF THE DRAWINGS

FIGS. 6A, 6B, 6C, 6D, 6E, and 6F each illustrate a method performed by a UE according to one or more embodiments.

FIG. 10 is a generalized block diagram of a host computer communicating via a base station with a user equipment over a partially wireless connection.

DETAILED DESCRIPTION

Figure 1:
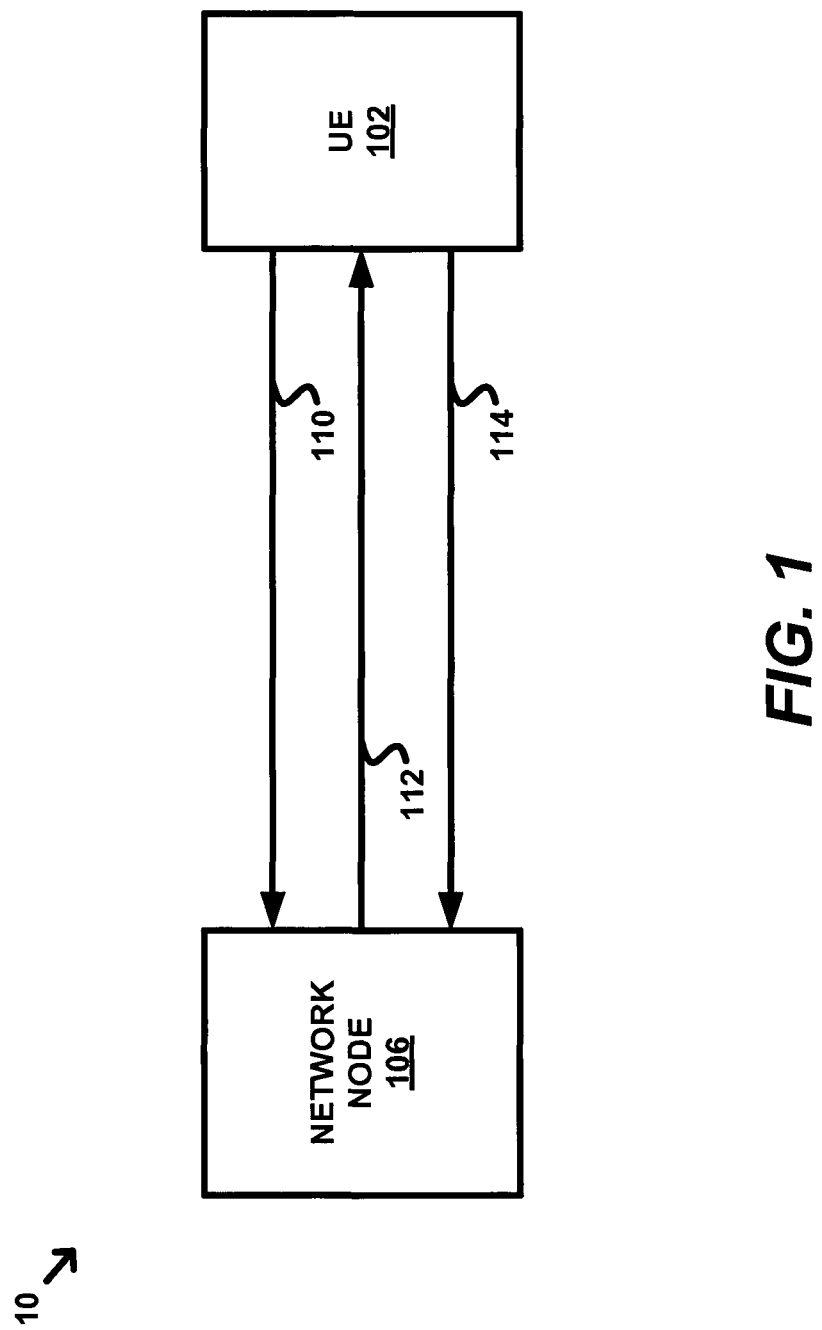
FIG. 1 illustrates a wireless communication system corresponding to example embodiments of the present disclosure.

FIG. 1 illustrates a wireless communication system 10 that includes a network node 106 (also referred to as radio network equipment, e.g., an eNB, base station, nodeB, etc.) and a UE 102, which may be a NB-IoT device according to example embodiments of the present disclosure. System 10 can constitute an NB-IoT system according to one or more embodiments.

The UE 102 is configured to perform random access (RA) procedures, for example, in order to obtain initial access when establishing a radio link, for transmitting a scheduling request, and/or for achieving uplink synchronization. Regardless of the particular objective for initiating this random access procedure, the UE 102 initiates a random access procedure by performing a first random access transmission to the network node 106. This initial transmission can be referred to herein as a preamble message, random access message 1, or transmission 110, as part of a particular random access procedure. Where the system 10 is a NB-IoT system, for instance, the UE 102 may transmit the random access channel transmission over a narrowband physical random access channel (NPRACH), such that the random access channel transmission is an "NPRACH transmission" for purposes of NB-IoT and associated standards documentation or specifications. The network node 106, if it receives the preamble message or transmission 110, can transmit RA response signaling 112 (e.g., RA message 2) to the UE 102. This signaling 112 can include an uplink time-frequency resource grant for transmission of a connection request message 114 (e.g., RA message 3) transmitted by the UE 102.

In certain embodiments envisioned by the present disclosure, a UE 102 can improve upon the existing UE transmission power paradigm discussed above by determining transmission power levels for RA transmissions based on certain factors. For instance, in an aspect, a UE 102 can be configured to determine a transmission power with which the UE is to transmit a random access preamble in transmission 110 while operating within a certain coverage enhancement level. This transmission power can, in some examples, be determined as a function of a target receive power with which the random access preamble transmission is targeted to be received by a network node. Additionally or alternatively, the transmission power for transmission 110 (or other transmissions in the RA procedure, generally) can be determined based on a path loss between the UE 102 and the applicable network node 106 to which the RA preamble transmission is targeted.

In a further aspect of the embodiments presented herein, the UE 102 can determine another (transmission power with which the UE is to transmit a connection request in the random access procedure, wherein the other transmission power is determined as a function of the target receive power with which the random access preamble transmission was targeted to be received; and For purposes of the present disclosure, the "another transmission power" is meant to describe a transmission power for one or more transmissions other than the RA preamble transmission 110, such as a connection request message transmission (e.g., RA message 3), that is derived through a separate determination than the determination performed by the UE 102 related to the RA preamble transmission power. This is in contrast to the "another" or "other" transmission power being of a different value than that of the RA preamble transmission power level determined by the UE 102. To be clear, in the example embodiments herein, the term "another transmission power" and the corresponding term "other transmission power" do not refer to two distinct transmission powers or power levels and instead refer to the same transmission, the unique words being necessary for grammatical purposes.

Figure 2:
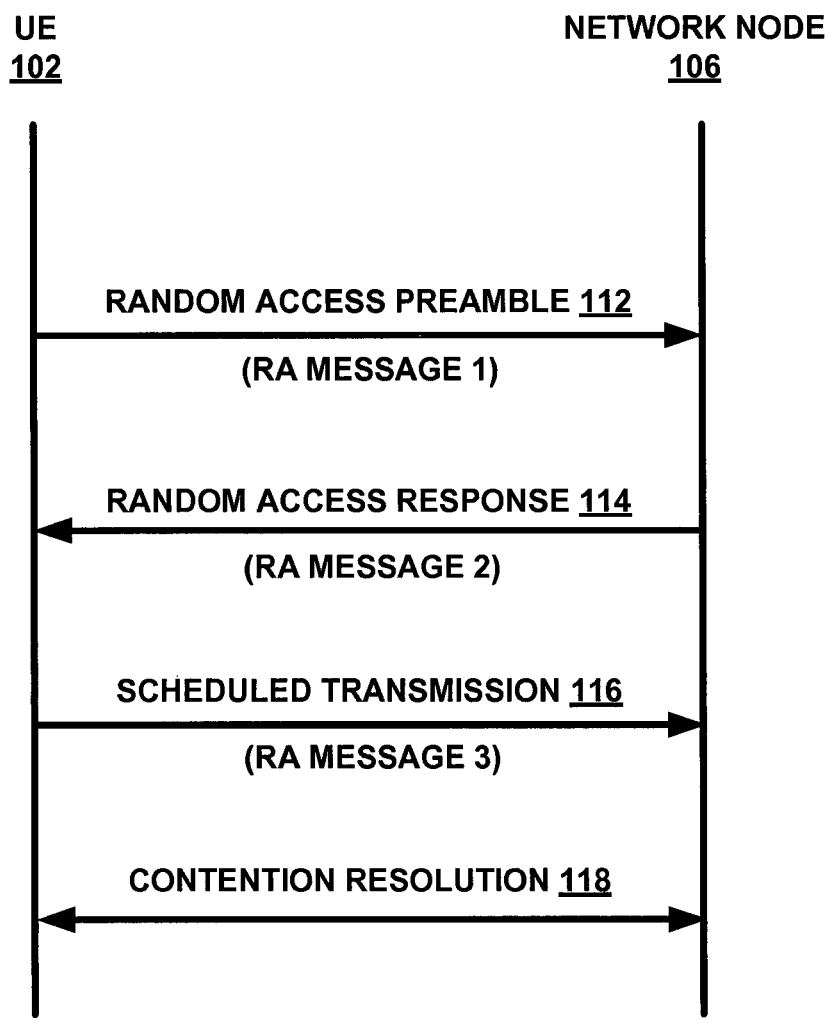
FIG. 2 illustrates an example random access procedure utilized in the wireless communication system.

FIG. 2 illustrates an example random access procedure performed in the system 10 of FIG. 1. As illustrated, the random access procedure includes a message 1 (corresponding to transmission 110 of FIG. 1) transmitted by the UE 102 and containing a random access preamble. In addition, the RA procedure also can include transmission 114 of a message 2 by a network node 106 to the UE 102 and is responsive to the random access preamble transmission in message 1. The message 2 can include one or more time-frequency grants for UE 102 transmission of a connection request in message 3 (transmission 116). In some instances, a contention resolution message and/or procedure 118 containing several messages 4 can be utilized by the UE 102 and/or network node 106 to indicate whether the connection is successful or whether further random access procedure attempts are needed.

Returning to FIG. 1, for transmissions 110 and 112, the UE transmits the messages according to a transmission power (which may be different for each message) determined by one or more rules (or instructions) obtained and implemented by the UE 102. The aspects of the present disclosure concern the determination of these transmission power levels. The explanation that follows presents information that clarifies the example implementation scenarios of the present techniques and example embodiments.

In a feature referred to generally as coverage enhancement (CE), NB-IoT uses repeated transmissions to extend its coverage compared to earlier-supported 3GPP radio access technologies. In fact, when accessing the system using CE, a UE 102 may repeat a Narrow Band Random Access Channel (NPRACH) preamble transmission up to 128 times to achieve coverage in demanding channel conditions. The NB-IoT radio interface has therefore been designed with three separate NPRACH radio resources, each being associated with a defined coverage range and number of transmission repetitions.

Figure 3:
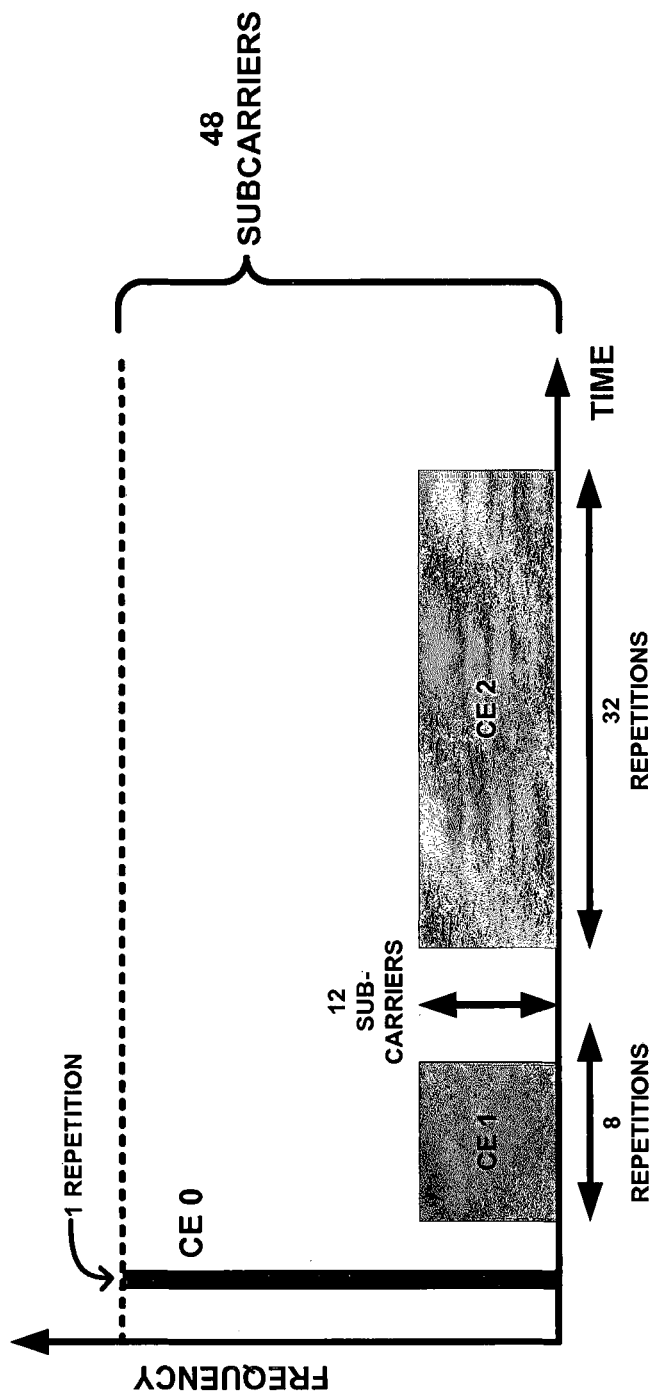
FIG. 3 illustrates a typical NB-IoT Physical Random Access Channel (NPRACH) configuration with corresponding time-frequency resources and repetition numbers for different coverage enhancement levels.

FIG. 3 illustrates a typical NPRACH configuration with three resources for CE level 0 (CE0), CE level 1 (CE1), and CE level 2 (CE2). In an aspect, the left-most NPRACH resource is intended for UEs communicating in relatively good radio conditions, and therefore the random access preamble is sent only once. The system may configure two additional NPRACH resources CE 1 and CE 2, however, to be used by UEs in "extended" and "extreme" coverage, where each NPRACH resource is associated with a coverage enhancement (also referred to as coverage extension) level. A CE level is furthermore associated with a set of repetitions of the random access preamble transmission, with the number of repetitions increasing with the coverage intended to be supported by the NPRACH resource.

To select a NPRACH resource, the UE 102 measures a downlink received power of a transmission received from a network node 106, and based on this downlink received power and a set of broadcasted signal level thresholds, makes a selection of the NPRACH resource to use for its system access. As explained above, this selection will ultimately correspond to the number of times the random access transmission will be repeated. To make the selection as to the CE level and corresponding time-frequency resources to be employed for a certain RA transmission or set thereof, UEs 102 can be configured to employ thresholding. This determination based on CE level thresholding is illustrated in FIG. 4.

In the example presented in FIG. 4, assuming that the network node 106 transmits 106 NB-IoT subcarriers at 43 dBm, the power per 15 kHz sub-carrier is ~32 dBm. If CE1 starts at a coupling loss of 144 dB and CE 2 at a coupling loss of 154 dB then two NRSRP thresholds ($P_{CE,Th.1}$ and $P_{CE,Th.2}$) may be associated with NRSRP levels of 32−144=−112 dBm and 32−154=−122 dBm.

In an aspect of RA transmission procedure described herein, when a UE 102 accesses the radio access network of system 10 using the first CE level (e.g., CE level 0), it can utilize power control techniques to meet a received power level target at the network node 106 and can do so by taking an estimated path loss between the UE 102 and the network node 106 into account. For CE levels 1 and 2, existing standards require the UE 102 to use transmission repetitions and to transmit at its maximum configurable power $P_{CMAX,c}$, which is limited by the allowed power in the cell. In particular, in 3GPP TS 36.213, this procedure is specified as:

For the lowest configured repetition level, a narrowband preamble transmission power $P_{NPRACH}$ is determined as:

$$P_{NPRACH} = \min\{P_{CMAX,c}(i) + \text{NARROWBAND\_PRE-}\\\text{AMBLE\_RECEIVED\_TARGET\_POWER} + PL_c\}\\ [\text{dBm}]$$

where $P_{CMAX,c}(i)$ is the configured UE transmission power for narrowband IoT transmission defined . . . for subframe i of serving cell c and $PL_c$ is the downlink path loss estimate calculated in the UE for serving cell c. For a repetition level other than the lowest configured repetition level, $P_{NPRACH}$ is set to $P_{CMAX,c}(i)$ where, according to standards document 3GPP TS 36.101, $P_{CMAX,c}$ is set within the following bounds:

$$P_{CMAX\_L,c} \leq P_{CMAX,c} \leq P_{CMAX\_H,c}$$

and where:

$$P_{CMAX\_L,c} = \min\{P_{EMAX,c}, P_{PowerClass} - MPR_c - A\text{-}MPR_c\}$$

and $$P_{CMAX\_H,c} = \min\{P_{EMAX,c}, P_{PowerClass}\}$$

$P_{EMAX,c}$ in the above expressions represents the maximum allowed power in the serving cell and is signaled to the UE 102 using the P-max information element (IE) in a system information block (SIB) transmitted by the network node 106 to the UE 102. In addition, $MPR_c$ is the maximum power reduction and A-MPRc represents the additional maximum power reduction in the above expressions. The NARROWBAND_PREAMBLE_RECEIVED_TARGET_POWER parameter is calculated as:

preambleInitialReceivedTargetPower−10 log 10(numRepetitionPerPreambleAttempt), where the preambleInitialReceivedTargetPower IE represents an initial target receive power for the transmission 110 at the network node 106 and can be set to a value, for example, between −90 and −120 dBm (though this range is not limiting and can be extended to constitute a wider range). In addition, numRepetitionPerPreambleAttempt corresponds to the lowest configured repetition level.

For instance, if one envisions an example where a UE 102 uses a transmission power of 23 dBm, the numRepetitionPerPreambleAttempt is set to 1, and the preambleInitialReceivedTargetPower is configured to −116 dBm, a UE 102 experiencing a coupling loss less than 23−(−116)=139 dB will down-regulate the uplink transmission power. On the other hand, a UE 102 experiencing a coupling loss greater than 139 dB will use its maximum configurable power to come as close to the targeted power level as possible. FIG. 4B illustrates an example of such a relation between CE level selection and the NPRACH power configuration using UL open loop power control.

Currently for each CE level a UE may attempt a random access attempt up to K times, where K at most can be configured to 10. In CE 0 the UE may ramp up the initial selected power level for each random access attempt. A UE in CE1 or CE2 always uses full power to transmit NPRACH and can hence not use power ramping. Moreover, after reaching the maximum attempts K of sending NPRACH in a CE level N, if a UE does not receive any random access response from the eNB, the UE would ramp up to CE level N+1, and use the resource of CE level N+1 to continue sending the NPRACH with more repetitions.

Additionally, after the UE 102 has successfully performed the random access procedure, it enters a connected mode of operation where the number of repetitions utilized for data transmission and acknowledgement/non-acknowledgement (ACK/NACK) transmission is governed by the network side (e.g., network node 106) Accordingly, in an example, the network node 106 may determine that a particular UE 102 should utilize a NPUSCH Format 1 for data transmission and NPUSCH Format 2 for ACK/NACKS. In general, the Downlink Control Information (DCI) messages sent over the NPDCCH control these settings related to UE transmission repetition while the UE is in connected mode. One situational exception to this rule is the NPUSCH carrying message 3 of the RA procedure (connection request), the resources for which are controlled by the time-frequency grant transmitted to the UE 102 by the network node 106 to the UE 102.

The UE transmission power (also referred to as "transmission power" herein and in certain standards documents referenced herein) is defined in 3GPP TS 36.212 as:

The UE transmission power $P_{NPUSCH,c}(i)$ for NPUSCH transmission in NB-IoT

UL slot i for the serving cell c is given by

If the number of repetitions of the allocated NPUSCH RUs is greater than 2

$$P_{NPUSCH,c}(i) = P_{CMAX,c}(i) [\text{dBm}]$$

otherwise $$P_{NPUSCH,c}(i) = \\ \min\left\{ \begin{array}{l} P_{CMAX,c}(i), \\ 10\log_{10}(M_{NPUSCH,c}(i)) + P_{O\_NPUSCH,c}(j) + \alpha_c(j) \cdot PL_c \end{array} \right\} [\text{dBm}]$$

where $P_{CMAX,c}(i)$ is the configured UE transmission power defined in [6] in NB-IoT UL slot i for serving cell c.

$M_{NPUSCH,c}(i)$ is {¼} for 3.75 kHz subcarrier spacing and {1, 3, 6, 12} for 15 kHz subcarrier spacing $P_{O\_NPUSCH,c}(j)$ is a parameter composed of the sum of a component $P_{O\_NOMINAL\_NPUSCH,c}(j)$ provided from higher layers and a component $P_{O\_UE\_NPUSCH,c}(j)$ provided by higher layers for j=1 and for serving cell c where j∈ {1,2}. For NPUSCH (re)transmissions corresponding to a dynamic scheduled grant then j=1 and for NPUSCH (re)transmissions corresponding to the random access response grant then j=2.

$P_{O\_UE\_NPUSCH,c}(2) = 0$ and $P_{O\_NOMINAL\_NPUSCH,c}(2) = P_{O\_PRE} + \Delta_{PREAMBLE\_M\_sg3}$, where the parameter preambleInitialReceivedTarget- Power [8] ($P_{O\_PRE}$) and $\Delta_{PREAMBLE\_Msg3}$ are signalled from higher layers for serving cell c.

For j=1, for NPUSCH format 2, $\alpha_c(j)$=1; for NPUSCH format 1, $\alpha_c(j)$ is provided by higher layers for serving cell c. For j=2, $\alpha_c(j)$=1.

$PL_c$ is the downlink path loss estimate calculated in the UE for serving cell c in dB and $PL_c$=nrs-Power+nrs-PowerOffsetNonAnchor−higher layer filtered NRSRP, where nrs-Power is provided by higher layers and Subclause 16.2.2, and nrs-powerOffsetNonAnchor is set to zero if it is not provided by higher layers and NRSRP is defined in [5] for serving cell c and the higher layer filter configuration is defined in [11] for serving cell c.

$P_{cmAx,c}(i)$ is the configured UE transmission power defined in [6] in NB-IoT UL slot i for serving cell c.

Also, in such a scenario, when in connected mode, the maximum configurable transmission power for the UE 102 $P_{CMAX,c}$ is limited by lower and upper bounds as described above—and is a function of $P_{EMAX,c}(i)$, which is the maximum allowed transmission power in the serving cell and is signaled using the P-max IE in a SIB message transmitted by the network node 106. In the case of message retransmissions (or the number of repetitions for the CE level) corresponding to the random access response grant (i.e., RA Message 3 (Message 3)) transmissions, the targeted NRSRP is defined by the sum of preambleInitialReceivedTargetPower and $\Delta_{PREAMBLE\_Msg3}$. As introduced above, preambleInitialReceivedTargetPower can be configured in the range of −90 to −120 dBm, while the latter can is configured by the deltaPreambleMessage 3 IE to a value between −2 and 106 dB.

Figure 4A:
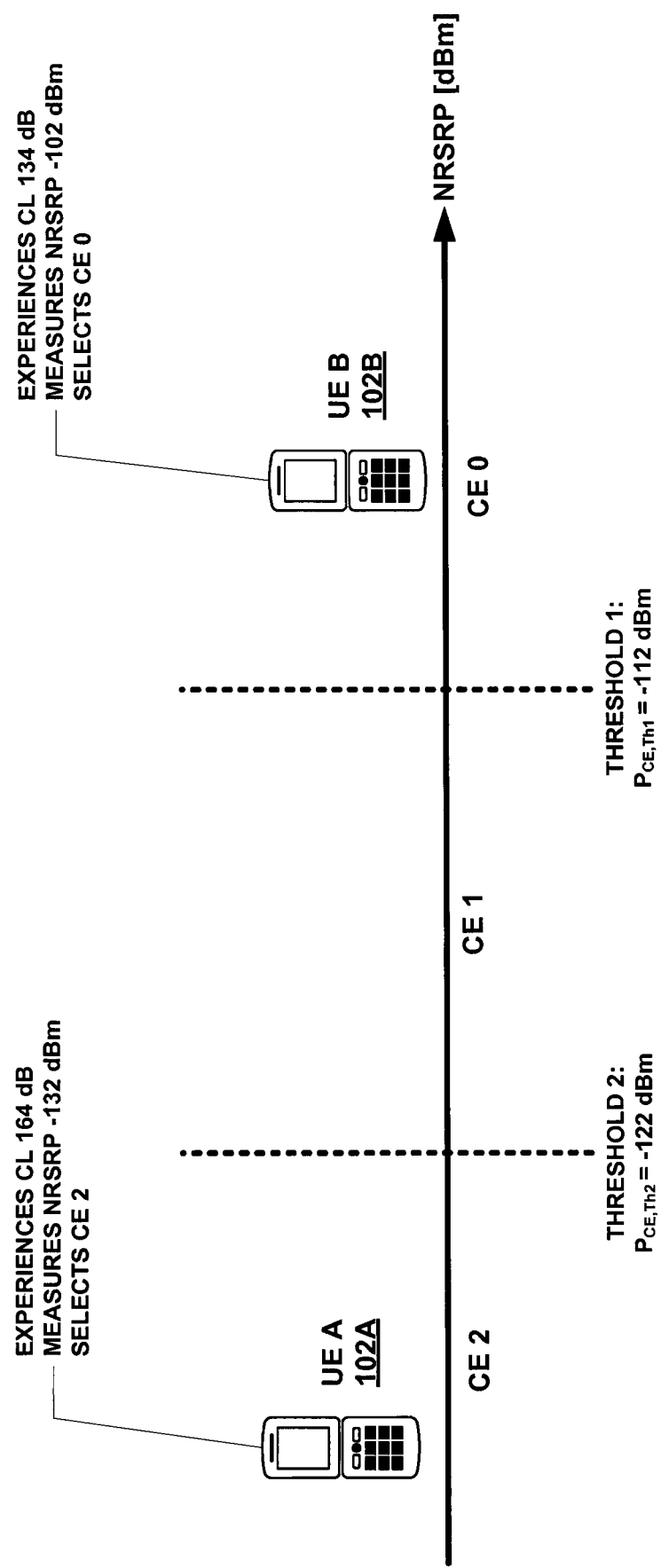
FIG. 4A illustrates example NPRACH thresholds according to one or more embodiments.
Figure 4B:
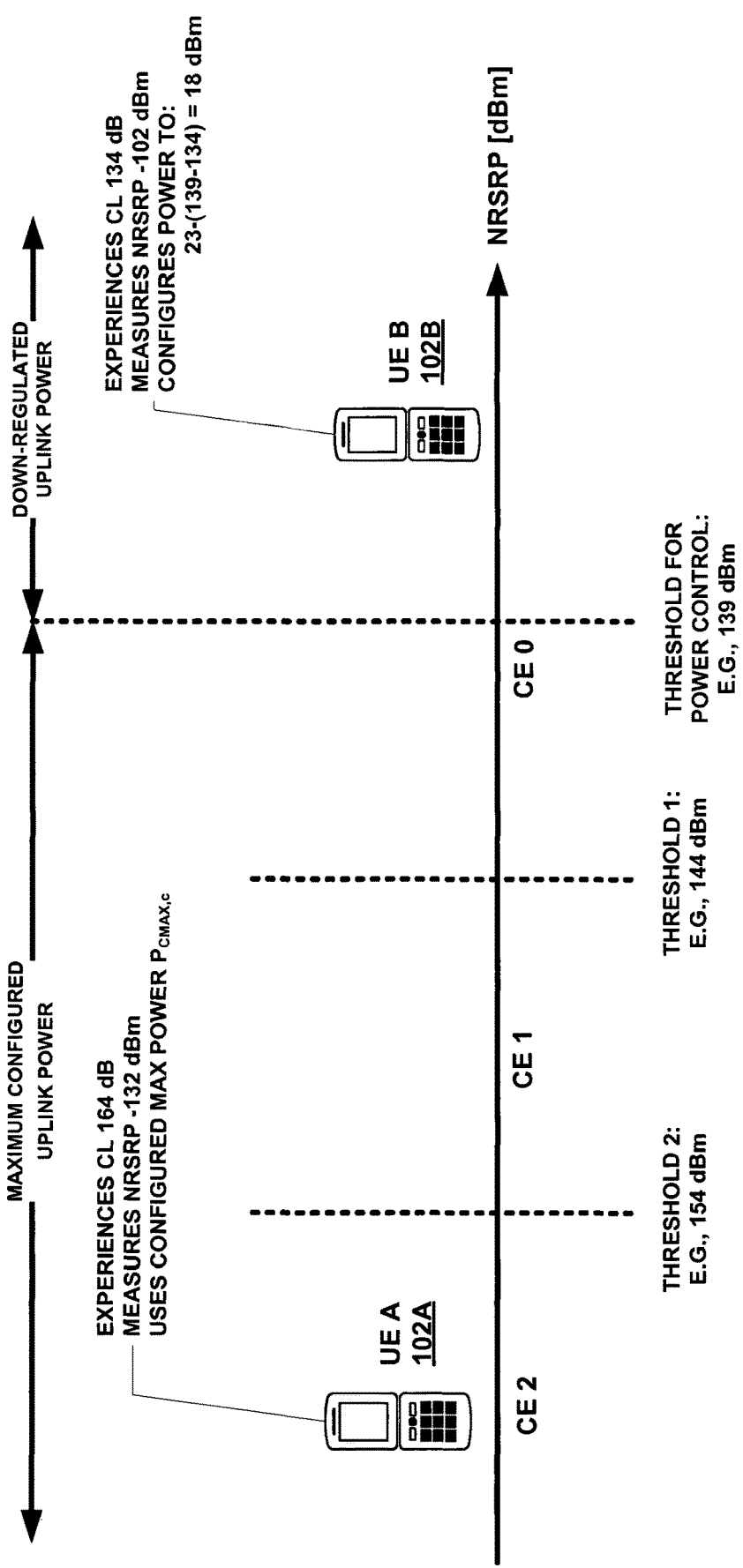
FIG. 4B illustrates NPRACH CE level selection and UL open loop power control according to one or more embodiments.

As an example, one could assume that UE 102B in FIG. 4A is assigned a single transmission using 15 kHz subcarrier for the Message 3 transmission. In addition, preambleInitialReceivedTargetPower is still set to −116 dBm and deltaPreambleMessage 3 is set to 0 dB. The configured power then becomes $P_{NPUSCH,c}$=10 log 10(1)+−116+1×134=18 dBm. In such a scenario, the UE 102 A would use the maximum power of 23 dBm regardless of the assignment due to being in such deep coverage that it requires an assignment with multiple transmission repetitions. In the case of subsequent NPUSCH transmissions corresponding to dynamic scheduled grants then $P_{O\_NOMINAL\_NPUSCH,c}(j)$ can be configured in the range −126 to 24 dBm and $P_{O\_UE\_NPUSC\ H,c}(j)$ in the range −8 to +7 dB.

In NB-IoT, the feedback from the UE 102 to the network (i.e., through network node 106) is kept relatively low. For instance, the UE 102 provides Hybrid Automatic Repeat Request (HARQ) ACK/NACK feedback in response to NPDSCH transmissions and a power headroom report (PHR) in RA message 3 (i.e. an RA connection request message). In such examples, PHR feeds back the difference between the estimated needed NPUSCH uplink power and the maximum configurable UE output power, which corresponds to $P_{CMAX,c}$ in NB-IoT. Specifically, in 3GPP TS 36.213, the PHR functionality is defined as:

If the UE transmits NPUSCH in NB-IoT UL slot i for serving cell c, power headroom is computed using $$PH_c(i)=P_{CMAX,c}(i)-\{P_{O\_NPUSCH,c}(1)+\alpha_c(1) \cdot PL_c\}[dB]$$

where, $P_{CMAX,c}(i)$, $P_{O\_NPUSCH,c}(1)$, $\alpha_c(1)$, and $PL_c$, are defined in Subclause 16.2.1.1.1.

The power headroom shall be rounded down to the closest value in the set [PH1, PH2, PH3, PH4] dB . . . and is delivered by the physical layer to higher layers.

The PHR has been specified to support four code points. To support this format, the measured PHR must be mapped to one out of four reporting values, and to determine which of the four reporting values is applicable in a given case, two different mapping tables have been defined—namely, Table 1 and Table 2, which are reproduced below. Table 1 includes PHR values reported for UEs under CE level 0, whereas Table 2 gives PHR values reported for UEs under CE levels 1 and 2. and the table used of the two tables that is used in a given scenario is defined by the UE-experienced signal-to-noise ratio (SINR).

TABLE 1

PHR for UEs selecting NPRACH CE level 0.

| Reported value | Measured quantity value (dB) |
|---|---|
| POWER_HEADROOM_0 | −54 < PH < 5 |
| POWER_HEADROOM_1 | 5 ≤ PH < 8 |
| POWER_HEADROOM_2 | 8 ≤ PH < 11 |
| POWER_HEADROOM_3 | PH ≥ 11 |

TABLE 2

PHR for UEs selecting NPRACH CE level 1 or 2.

| Reported value | Measured quantity value (dB) |
|---|---|
| POWER_HEADROOM_0 | −54 < PH < −10 |
| POWER_HEADROOM_1 | −10 ≤ PH < −2 |
| POWER_HEADROOM_2 | −2 ≤ PH < 6 |
| POWER_HEADROOM_3 | PH ≥ 6 |

For example, if one assumes a UE 102 is currently in a cell where $P_{CMAX,c}$=23 dBm, $P_{O\_NOMINAL\_NPUSCH,c}(j)$=−116 dBm, $P_{O\_UE\_NPUSC\ H,c}(j)$=0 dB and $\alpha_c(1)$=1, UE 102B from FIG. 3 would calculate Power Headroom (PH)=23−(−116+134)=23−18=5 dB and would therefore report PHR 1 (assuming the mapping in Table 1 is employed). Depending on this received PHR, the network node 106 can use it to increase the number of sub-carriers assigned to the UE from 1 to 3. As a result, the UE 102 would increase its UL power to 23 dBm.

UE 102A of FIG. 4B would calculate PH=23−(−116+164)= 23−18=−25 dB and report PHR 0 (assuming mapping in Table 2 is used). Upon receiving such a PHR message, the network node 106 will recognize that the UE is in deep coverage and needs to be assigned many repetitions.

Extending such support for the PHR report beyond just RA Message 3 transmission is part of the scope of the NB-IoT Release 15 (Rel-15) work items. It has been observed in early NB-IoT field trials that the power and CE level ramping procedure described above may cause UEs 102 experiencing relatively good network coverage to nevertheless ramp from CE level 0 to CE level 1, and thereby unnecessarily operate at full power. In these examples, the CE-level ramping can be caused by shortage of RA response resources or by high levels of UL or DL interference causing access attempts to fail. In fact, since a UE 102 in CE 0 may be close to the serving base station this behavior may expose the base station to high interference levels.

Solutions to these problems have been proposed, but these proposed solutions have problems of their own. For instance, it has been proposed that a UE 102 be required to perform NB-IoT NPRACH power control when a it changes from CE level 0 to CE level 1 or 2. In one proposed implementation, a UE 102 that has changed from CE level 0 to another CE level can use the CE level 0 power ramping procedure at the new CE level. In another proposed solution, a network node 106 (e.g., eNB) can signal if it supports an updated (e.g., Rel-13) NB-IoT NPRACH power control procedure to use the NPRACH level 0 power control method in all NPRACH levels, whereby the UE 102 receiving such a signal from the network node 106 can optionally use the updated NPRACH power control if it has been implemented in the UE 102.

Simply reusing the CE level 0 power control procedures in all NPRACH levels cannot solve the mentioned problem, however. Specifically, one with such proposals is that it may not be suitable to reuse the CE level 0 preambleInitialReceivedTargetPower level for CE levels 1 and 2 and simply scale it with the repetition number configured for CE level 1 and 2. In particular, for a network limited by interference, CE levels 1 and 2 may be used to overcome high interference levels, and in such cases it is not suitable to reduce the preambleInitialReceivedTargetPower by a factor of 10 log 10(numRepetitionPerPreambleAttempt) as specified for CE level 0.

Furthermore, for a UE 102 accessing the system on CE level 1 or 2, the network node 106 would assume the accessing UE 102 is under extended coverage conditions and may therefore schedule the subsequent RA Message 3 (i.e., connection request) with repetitions. As mentioned above, if Message 3 is scheduled with repetitions according to a CE level, for instance, then the UE 102 would transmit the NPUSCH carrying Message 3 with full power. Therefore, when a UE is transmitting Message 3, it may still cause similar interference problems as identified above in the NPRACH.

Accordingly, the present disclosure presents example embodiments that venture to solve the problems surrounding interference issues caused by UEs in good coverage using NPRACH CE levels 1 or 2 for Message 3 transmissions with full uplink (UL) transmission power due to CE level ramping. For instance, one example solution proposed by embodiments described herein is to set the targeted signal power level in a given CE level N based on the coupling or path loss associated with the threshold for selecting the CE level N.

In addition, for UEs 102 that initially choose NPRACH CE level 0 and later ramp up to other NPRACH CE levels 1 or 2, not only is NPRACH power control required, but other means need to be introduced to further control the transmission power utilized for transmission of the subsequent Message 3 by the UE 102 to help control the interference. For example, in a first solution proposed by the present disclosure, a network node 106 can be informed that a UE 102 accessing CE level 1 or 2 is actually a CE level 0 device using power control. By following this proposed paradigm, the eNB can avoid allocating an unnecessarily high number of repetitions and transmitting Message 3 and any further transmissions at full (or unnecessarily high) transmission power levels.

Each of these techniques for addressing these and other problems with existing attempted solutions will be expanded upon in further detail below and in reference to the attached Figures. For instance, in a first embodiment an open-loop power control technique can be implemented in a UE 102, whereby a transmission power for a transmission (e.g., RA Message 1, Message 3, etc.) is determined by the UE for a particular CE level. In an aspect, where such a CE level is CE level 1, the transmission power $P_{NPRACH}$ can be determined by the UE 102 according to the following expression:

$$P_{NPRACH} = \min\{P_{CMAX,c}(i), \text{NARROWBAND\_PREAMBLE\_RECEIVED\_TARGET\_POWER} + PL_c\} \text{ [dBm]}$$

where in some example embodiments the NARROWBAND PREAMBLE RECEIVED TARGET POWER is set to:

$$23 \text{ dBm} - CL_{CE,Th,1}$$

where $CL_{CE,Th,1}$ represents the coupling loss threshold for CE level 1.

In an additional aspect of the present disclosure, a technique for determining a transmission power $P_{NPRACH}$ for UEs 102 operating according to CE level 2 is presented. For instance, according to such a technique, the transmission power used by the UE 102 using such a CE level 2 can be determined according to:

$$P_{NPRACH} = \min\{P_{CMAX,c}(i), \text{NARROWBAND\_PREAMBLE\_RECEIVED\_TARGET\_POWER} + PL_c\} \text{ [dBm]}$$ with the NARROWBAND_PREAMBLE_RECEIVED_TARGET_POWER set to:

$$23 \text{ dBm} - CL_{CE,Th,2}$$

where $CL_{CE,Th,2}$ represents the coupling loss threshold for CE level 1.

In yet another example embodiment for addressing the above-introduced issues, a shift or "adjusting factor" of Y dB of the NARROWBAND_PREAMBLE_RECEIVED_TARGET_POWER in CE level X is specified as:

$$23 \text{ dBm} - CL_{CE,Th,X} - Y$$

In a further aspect, a network node 106 can signal the adjusting factor Y to adjust the UE estimated coupling loss, or pathloss, or the preamble received target power for any CE level.

In addition to those example aspects introduced above, in some example embodiments of the present disclosure, a set of NPRACH preambles in some relatively higher CE levels can be reserved for use by the UE 102 as the CE and associated power level and/or transmission repetitions ramps up from lower CE levels. For example, in a non-limiting example, after finishing the maximum NPRACH attempts in CE level 0, instead of using the regular NPRACH preambles for CE level 1, in certain embodiments of the present disclosure, the UE 102 can use a special set of NPRACH preambles reserved in CE level 1 to continue the NPRACH procedure. In this way, the network node 106 can identify these UEs 102 and can potentially schedule less repetitions for UE transmissions of Message 3 to allow the Message 3 NPUSCH to be effectively power controlled.

Also, the network node 106 can issue Transmission Power Control (TPC) commands (or similar commands or information—non-exclusive examples include, in some examples, preferred received power target, pathloss adjustments, and so on) in Message 2 to further adjust the transmission power of Message 3. Furthermore, the network node 106 that implements these techniques can set aside a special set of preambles just for the above-mentioned purpose. In addition, in some examples, the UE 102 can optionally apply power control for RA Message 3 based on whether the UE 102 ramped up from CE level 0 (in which case power control should be used, in an example) or if the UE did not ramp up, and instead, initially selected its CE level as CE level 1 or CE level 2 (in which case power control would not be utilized, as in Rel-13 operation).

To implement such a feature and/or corresponding signaling, the network node 106 can utilize explicit signaling in Message 2 (RA resource grant message, or "Random Access Response" (RAR) message) or can indicate necessary information to the UE 102 implicitly by using a combination of different fields, which can include existing fields or new fields. Specifically, these different fields of the RAR message could be used (a) to indicate whether the UE 102 is to apply power control for RA Message 3 (e.g., via binary using one of the available 'R'-bits) or (b) to transmit one or more TPC messages to the UE 102 based on the Message 1 preamble reception.

It is also worth noting that the RSRP measurement accuracy of UEs is relatively poor—and accordingly, it is not uncommon for UEs 102 utilizing CE level 0 to incorrectly identify the NPRACH resource to be utilized for RA Message 1 transmission for UEs 102 using CE level 1. The above solution could be a way for the network to either enable power control for RA Message 3 transmission or even directly regulate the UEs transmission power by sending a TPC in RA Message 2, either of which can be based on the high energy detected in the reception of Message 1.

Practically speaking, the TPC information must be somehow transmitted to the UE 102 appropriately. In an aspect of the present disclosure, consider the example Medium Access Control (MAC) RAR message structure 60 presented in FIG. 6. As shown in the example RAR structure 60, there are a total of six reserved 'R'-bits in the example NB-IoT RAR message structure 60, each of which could be used purposes of conveying the TPC messages/commands to a particular UE 102. In other words, these reserved 'R'-bits could be used to either indicate whether or not the UE it should apply power control for Message 3 (e.g. binary using 1 'R'-bit) or send a TPC to the UE based on the Message 1 preamble reception.

The following additional aspects represent example techniques contemplated by the present disclosure for improving RA Message 3 transmission power control. Again, with reference to the following techniques, necessary information can be signaled between the network node 106 and/or UE 102 explicitly or implicitly by using one field or a combination of different fields (existing or new fields).

For instance, in an example embodiment related to Message 3 transmission power control, NARROWBAND_PREAMBLE_RECEIVED_TARGET_POWER (as defined above) can represent a target power level for the Message 3 NPUSCH transmissions, and can represent the target power level in some instances regardless of the number of repetitions used on the NPUSCH containing Message 3 for a particular CE level. In addition, in an aspect, if a UE 102 ramps from a relatively lower NPRACH CE level to higher NPRACH CE level, and if the Message 3 transmission is scheduled with repetitions, the UE 102 can adjust its transmission power P for Message 3 from the maximum configurable transmission power as a function of the number of repetitions scheduled for Message 3 according to the following relation:

$$P = P_{CMAX,c} - 10 * \log 10(\text{number of NPUSCH repetitions})$$

In a further example embodiment, if a UE 102 ramps up its NPRACH power within a particular CE level after a given number of attempts, and if the Message 3 transmission is scheduled with repetitions, the UE 102 may adjust its transmission power of Message 3 with respect the number of repetitions scheduled for Message 3. Additionally, in an aspect of the present disclosure, in a situation in which UE 102 ramps from lower NPRACH CE level to higher NPRACH CE level, the UE 102 can indicate to the network node 106 in Message 3 that it has ramped up from a lower NPRACH CE level in addition to providing information related to any aspects of Message 1 and/or Message 3 power control discussed herein.

Moreover, in a further example aspect of the present embodiments, the network node 106 can be configured to assist in the solutions highlighted herein. For instance, in some examples, the network node 106 can be configured to issue transmission power control (TPC)-related commands or information in Message 2, thereby assisting the UE 102 with adjusting the transmission power of Message 3 (or maybe subsequent NPUSH transmissions). In a related aspect, TPC-related commands or information can be transmitted by the network node 106 in system information (SI)/SIBs to help the UE with adjust the transmission power of Message 3 (and/or subsequent NPUSH transmissions). Non-exclusive examples of the information included in these TPC-related commands or SI can include, e.g., the preferred network node 106 received power target, information or commands for adjusting factors of pathloss estimation for some coverage levels (e.g., related to the number of repetitions used by Message 3), and so on.

Turning to a further RA procedure enhancement envisioned by the present disclosure, a UE 102 can assist the network node 106 (and network, generally) in ensuring that an optimal PHR mapping is utilized. As mentioned above, currently, the PHR mapping to be used for communication between the UE 102 and network node 106 is coupled to the selected CE level—namely, a UE 102 in CE level 0 should use Table 1 above, while a UE in CE level 1 or 2 should use Table 2. A UE 102 in good coverage making the transition from CE level 0 to CE level 1 is obligated under such a paradigm use a PHR according to Table 2 when accessing in CE 1 even though Table 1 is better suited to capture the power headroom of such a UE.

To address this issue, one solution envisioned by the present disclosure would be to introduce a code point in Message 3 that allows the UE to inform the network node 106 of which PHR mapping table it should use. For instance, a UE 102 in good coverage could then indicate the use of the PHR mapping in Table 1 above, regardless of the NPRACH CE level it uses for its initial access.

Figure 5A:
FIG. 5A illustrates a Medium Access Control Random Access Response message for NB-IoT in some examples embodiments.
Figure 5A:
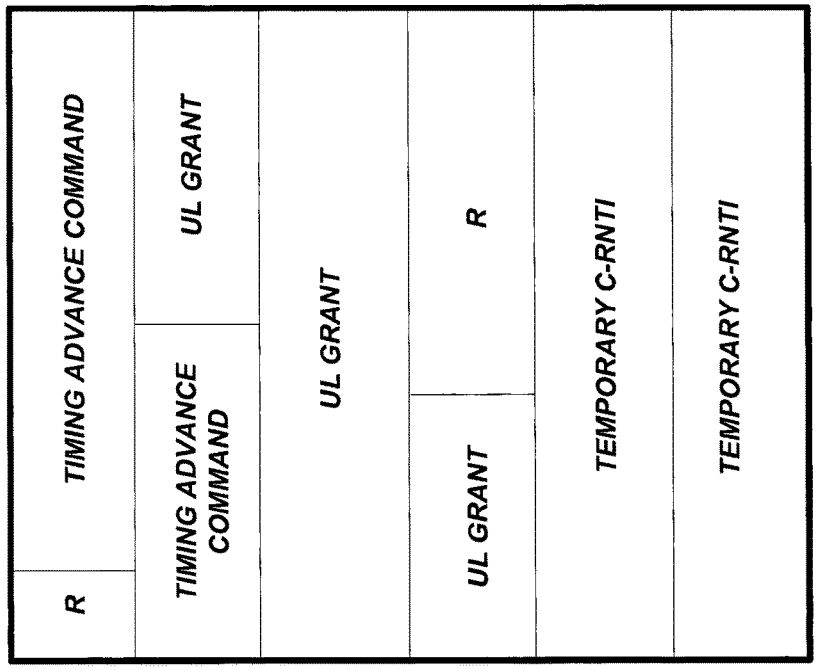
Figure 5B:
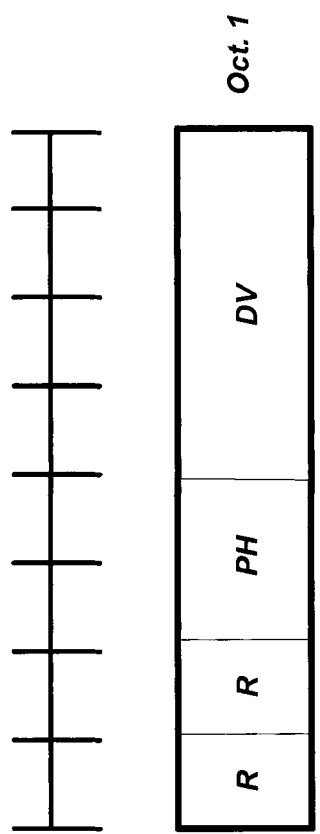
FIG. 5B illustrates a Data Volume and Power Headroom Report MAC control element in certain example embodiments.

In an example embodiment employing such a technique, a spare bit in Message 3 could be used to indicate which of the available PHR mapping tables were used/are being used by the UE 102. In another aspect, a spare bit in the data volume and power headroom report (DPR) MAC CE sent in Message 3 could be used to indicate which of the PHR mapping tables was used. In some examples, a new MAC control element is introduced for this indication, and since only two tables are available candidates for use by the UE 102 in some instances, as little as a single bit may be required to indicate which PHR table to use. FIG. 5B illustrates how the DPR can be constructed to meet this end according to an example aspect of the present disclosure. In the DPR MAC control element shown in FIG. 5B, the 'R'-bits are reserved bits which could be used for indicating the PHR mapping table used by the UE 102. Furthermore, the network node 106 could be configured to specify in system information that one 'R'-bit is used to indicate which PHR table is used (e.g., 'R=0': Table 1, 'R=1': Table 2, or vice versa).

In yet another example aspect, the PHR table could be indicated using a logical channel ID (LCID) in a MAC PDU sent in the uplink shared channel (UL-SCH). Accordingly, in some examples, either a new LCID reserved in the specification for this purpose could be used to indicate when a PHR table other than specified in Rel-13 operation is used, or two new LCIDs may be used that each correspond directly to Table 1 and Table 2. As seen from Table 3 below reproduced from 3GPP TS 36.321, there are several reserved LCID values which could be used for this purpose, as indicated by the emphasized entries:

TABLE 3

Values of LCID for UL-SCH

| Index | LCID values |
| --- | --- |
| 00000 | CCCH |
| 00001-01010 | Identity of the logical channel |
| 01011 | CCCH |
| 01100-10100 | Reserved |
| 10101 | SPS confirmation |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In an additional alternative contemplated by the present techniques, one or more bits can be reserved in a Radio Resource Control (RRC) message transmitted by the UE 102 as part of Message 3, the RRC message indicating which PHR table is used by the UE 102. Such RRC messages could include, but are not limited to, the RRC Connection Request and RRC Connection Resume Request transmitted by UE 102.

Further possibilities for a UE 102 to provide an indication regarding which PHR table is used by the UE 102 can include a new encoding format for Message 3 corresponding to a first grant by the network node 106. A non-limiting example is to perform an exclusive-or (XOR) function of a known binary vector over cyclic redundancy check (CRC) bits of the encoded Message 3 corresponding to the first grant. In yet another possible implementation, the indication of which PHR table is used by the UE 102 is made via a new modulation format for Message 3 corresponding to the first grant. A non-limiting example is to use a negative rotation index for the Message 3 modulation corresponding to the first grant. This corresponds to transmitting the NB-IoT NPUSCH Format 2 using-π/2-BPSK and -π/4-QPSK modulation.

In sum, the proposed example solutions above allow a network, including its network nodes 106, and UEs 102 accessing the network, to use a flexible uplink transmission power limitation to allow for improved UE 102 operation in extended coverage without the use of techniques that unnecessarily overconsume radio resources and thereby improve the uplink link budget.

Despite having particular applicability to NB-IoT, the example embodiments introduced by the present paper can likewise be applied to other wireless networks, including enhanced Machine-Type Communications (eMTC) as well as to successors of the Evolved Universal Mobile Telecommunications System (UMTS) Terrestrial Radio Access Network (E-UTRAN). Thus, references herein to signals using terminology from the 3GPP standards for Long-Term Evolution (LTE) should be understood to apply more generally to signals having similar characteristics and/or purposes, in other networks. This applies both to the descriptions of the example embodiments provided above as well as the example embodiments introduced below in reference to the remaining figures.

FIG. 6A illustrates an example method 600 performed by a UE 102 for performing random access in a wireless communication system 10. In accordance with certain aspects introduced above, method 600 includes, at block 602, determining a transmission power with which the UE 102 is to transmit a random access preamble while operating within a certain coverage enhancement level. In a requirement of method 600, the transmission power is determined by the UE 102 as a function of a target receive power with which the random access preamble transmission is targeted to be received by a network node. In addition, the determined transmission power can be a function of a path loss between the UE 102 and a network node 106.

Furthermore, at block 604, the method 600 can include the UE transmitting the random access preamble using the determined transmission power while operating within the certain coverage enhancement level. Method 600 can also include, at block 606, the UE 102 determining another transmission power with which the UE 102 is to transmit a connection request in the random access procedure. In an aspect, this other transmission power is determined as a function of the target receive power with which the random access preamble transmission was targeted to be received. In addition, although the transmission power of block 602/604 can be of a different power value (e.g. in dB), this is not a requirement. Instead, these transmission values may in some instances be the same or about the same. For purposes of the present disclosure, the distinction "another" or "other" when referring to a transmission power does not, therefore, refer to a degree of power or a power value, but instead to the distinctness of the individual transmission powers with which transmissions (e.g., Message 1 and Message 3 of an RA procedure) can be transmitted to a network node 106. With that distinction in mind, in a further aspect of method 600, at block 608, the UE 102 can transmit the connection request (i.e. RA Message 3) using the determined other transmission power.

In addition to the above-recited aspects of method 600, other aspects not explicitly disclosed in FIG. 6. For instance, in an example embodiment, the target receive power is a function of a configured UE transmission power minus at least a path loss threshold for operating within with the certain coverage enhancement level. In other examples, the target receive power is a function of a configured UE transmission power minus at least the path loss threshold for operating within the certain coverage enhancement level and a defined shift. In some embodiments method 600 includes receiving signaling indicating the defined shift, for instance, from a the defined shift is associated with the certain coverage enhancement level.

In some example embodiments, method 600 can further include the UE 102 selecting to transmit a random access transmission using the certain coverage enhancement level responsive to random access having failed using a different coverage enhancement level than the certain coverage enhancement level. For examples that implement this example aspect, the different coverage enhancement level can be associated with fewer transmission repetitions and/or a lower transmission power relative than the certain coverage enhancement level (i.e., a lower CE level). In some instances, method 600 can include the UE 102 selecting to transmit a random access transmission using the certain coverage enhancement level even though the path loss experienced by the UE is lower than the path loss threshold for operating within the certain coverage enhancement level.

As introduced above, determining the transmission power and/or the other transmission power can be performed according to: $P_{NPRACH}=\min\{P_{CMAX,c}, \text{NARROWBAND\_PREAMBLE\_RECEIVED\_TARGET\_POWER}+PL_c\}$ [dBm], with the NARROWBAND\_PREAMBLE\_RECEIVED\_TARGET\_POWER set to $P_{CMAX,C}-CL_{CE,Th,X}$, where $CL_{CE,Th,x}$ is a coupling loss threshold associated with coverage enhancement level X, where $P_{CMAX,C}$ is a configured UE transmission power, and where $PL_c$ is a path loss estimate calculated in the UE. In such examples, coverage enhancement level X can be the certain coverage enhancement level of any of the previously described example embodiments.

In a further aspect, the random access preamble transmission of method 600 can include a set of random access preambles that indicate that random access preamble transmission failed using a different coverage enhancement level than the certain coverage enhancement level. In some instances, the set of random access preambles further indicates the certain coverage enhancement level.

FIG. 6B illustrates another example method 610 performed by a UE 102 for performing random access in a wireless communication system 10. As shown in FIG. 6B, method 610 includes determining a transmission power with which the UE is to transmit a connection request as part of a random access procedure at block 612. In an aspect, the transmission power is determined as a function of a number of repetitions with which the connection request is to be transmitted (and/or an associated CE level). In addition, at block 614, method 610 can include transmitting the connection request with the determined transmission power.

FIG. 6C presents a flow diagram illustrating another example method 620 of the present disclosure that is performed by a UE 102 for performing random access in a wireless communication system 10. In an aspect, method 620 can include, at block 622, determining a transmission power with which the UE 102 is to transmit a connection request 114 (i.e., RA Message 3) as part of a random access procedure. In some examples, the transmission power is determined as a function of signaling received in a random access response (RA Message 2 112) of the random access procedure or received in system information, such as in a SIB transmitted by a network node 106. In addition, at block 624, the method 620 can include the UE 102 transmitting the connection request with the determined transmission power.

Furthermore, although not explicitly included in FIG. 6C, method 620 can include other example features, including the following. For instance, in some examples, the signaling indicates a received power target corresponding to the network node 106. Likewise, in some instances, the signaling includes one or more bits that indicate whether or not the UE 102 is to apply power control for one or more connection request transmissions. In an additional aspect, the signaling comprises a repetition level, a power level, and/one or more adjustment factors for path loss estimation for one or more coverage levels. The signaling can also include a number or repetitions to be utilized for random access preamble or connection request transmission, and/or one or more other parameters to be utilized for computing the power level to be used by the UE 102 for transmission of any random access message. Additionally or alternatively, the signaling can include one or more transmission power control (TPC) messages. In these examples or any other, the signaling can optionally indicate an adjustment factor for adjusting path loss estimation for a coverage level.

FIG. 6D shows an additional method 630 according to the present disclosure. Like the methods disclosed in FIGS. 6A-6C, the method 630 of FIG. 6D is performed by a UE 102 in a wireless communication system 10. The method includes, at block 632, transmitting signaling to a network node indicating a coverage enhancement level associated with a coupling loss experienced by the UE.

Figures 6E, 6F:
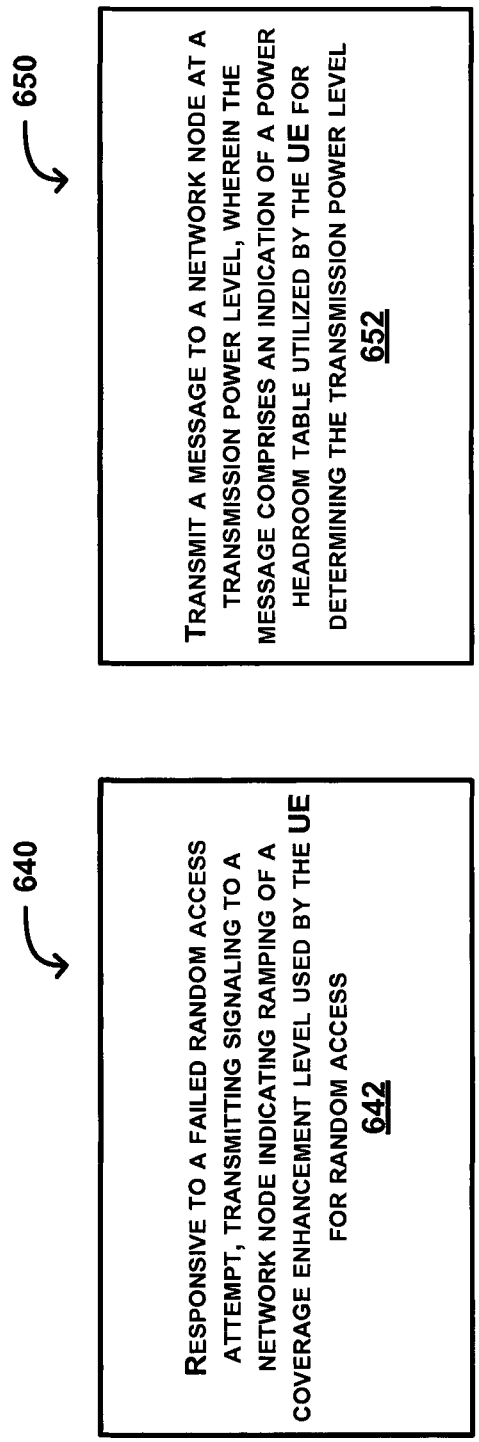

Likewise, FIG. 6E shows another method 640 performed by a UE 102 in a wireless communication system 10. The method 640 includes a UE 102, responsive to a failed random access attempt, transmitting signaling to a network node indicating ramping of a coverage enhancement level used by the UE 102 for random access.

In addition, FIG. 6E shows another method 640 performed by a UE 102 in a wireless communication system 10. The method 640 includes, at block 642, responsive to a failed random access attempt, transmitting signaling to a network node indicating ramping of a coverage enhancement level used by the UE 102 for random access.

FIG. 6F shows a further example method 650 performed by a UE 102 in a wireless communication system 10. The method 650 includes, at block 652, transmitting a message to a network node 106 at a transmission power level. According to method 650, the message includes an indication of a power headroom table utilized by the UE for determining the transmission power level.

Figure 7:
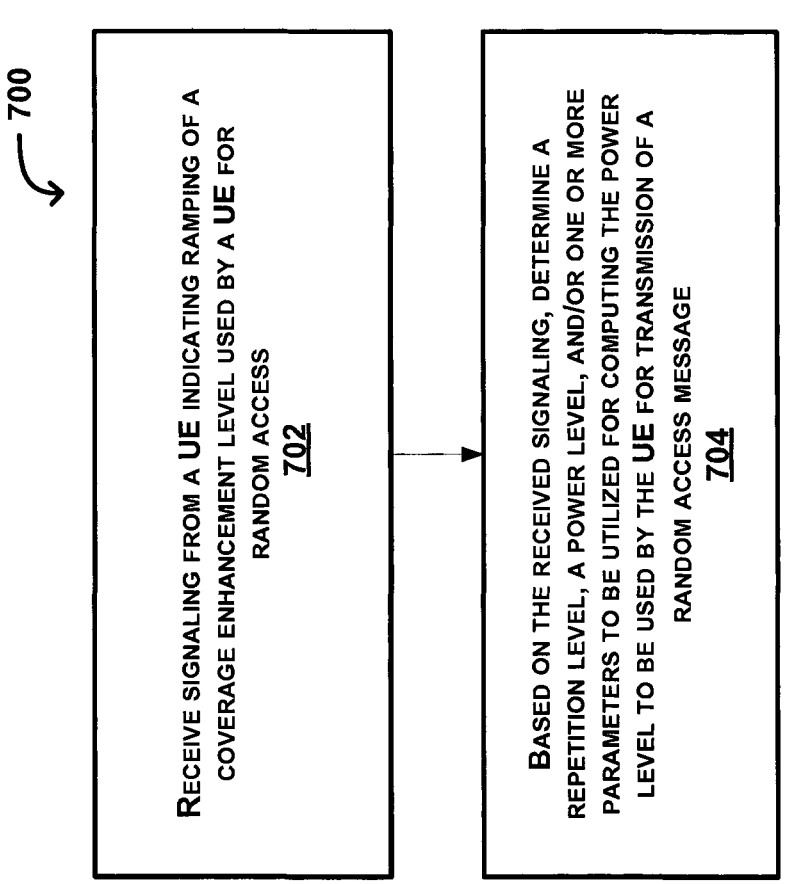
FIG. 7 illustrates a method performed by a network node according to one or more embodiments.

In addition, FIG. 7 illustrates an example method 700 of the present disclosure performed by network node 106. Although these aspects are presented in a single illustration in FIG. 7 and a single method 700, each aspect may stand alone or in combination with the other aspects. For instance, in method 700, the network node 106 may receive signaling from a UE 102 indicating ramping of a coverage enhancement level used by a UE 102 for random access, at block 702. In addition, at block 704, based on the received signaling, the network node 106 may determine a repetition level, a power level, and/or one or more parameters to be utilized for computing the power level to be used by the UE 102 for transmission of a random access message. Furthermore, at block 706, the network node 106 may transmit the signaling to the UE 102.

A network node 106 herein (which may also be referred to as a radio node) is any type of node (e.g., a base station or wireless communication device) capable of communicating with another node over radio signals. A network node/equipment 106 is any type of radio node/equipment capable and/or configured to operate within a wireless communication network, such as a base station. A network node 106 is any type of node capable and/or configured to operate within a wireless communication network, whether within a radio access network or a core network of the wireless communication network.

A UE 102 according to the present disclosure is any type of device capable of communicating with a network node using radio signals. A UE 102 may therefore refer to a machine-to-machine (M2M) device, a machine-type communications (MTC) device, a NB-IoT device, etc. A UE 102 may also be referred to as a wireless communication device, a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless communication device, wireless-enabled table computers, mobile terminals, smart phones, laptop-embedded equipped (LEE), laptop-mounted equipment (LME), Universal Serial Bus (USB)

dongles, wireless customer-premises equipment (CPE), etc. In the discussion herein, the terms machine-to-machine (M2M) device, machine-type communication (MTC) device, wireless sensor, and sensor may also be used. It should be understood that these devices may be a UE 102.

In an IoT scenario, a UE 102 as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

Note that the UE 102 (e.g., UE) as described above may perform the processing herein by implementing any functional means or units. In one embodiment, for example, the UE 102 comprises respective circuits or circuitry configured to perform the steps shown in FIGS. 6A-6E. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

In this description, coupling loss (CL) is the term used to describe the loss in signal strength between the transmitting node and the receiving node, where a UE 102 or a network node 106 can be the transmitting or receiving node, or vice versa. The 3GPP specifications referred to are using the term path loss (PL) to describe this loss in signal strength. Accordingly, although certain examples use the term path loss or coupling loss, the other term (either coupling loss or path loss, respectively) could be substituted for an alternative embodiment.

Figure 8B:
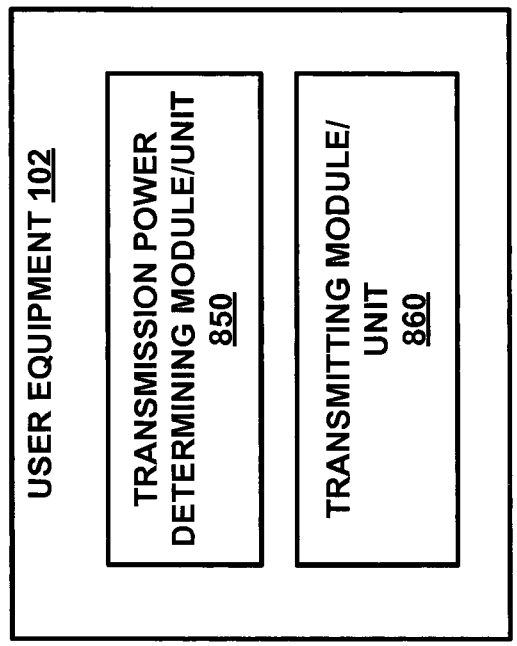
FIGS. 8A and 8B illustrate aspects of a UE in example embodiments of the present invention.
Figure 8A:
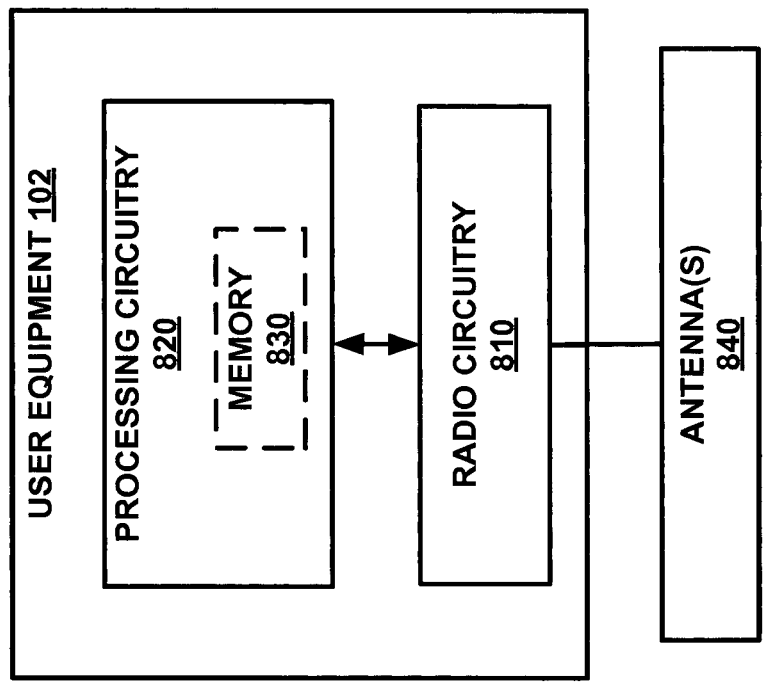

FIG. 8A illustrates additional details of a UE 102 (or, more generally, a wireless communication device) in accordance with one or more embodiments. As shown, the UE 102 includes processing circuitry (also referred to herein as a processor, one or more processors, processing unit (s) and the like) 820 and radio circuitry 810. The radio circuitry 810 is configured to transmit via one or more antennas 840. The processing circuitry 820 is configured to perform processing described above, e.g., in FIGS. 6A-6F, such as by executing instructions stored in memory 830. The processing circuitry 820 in this regard may implement certain functional means or units.

FIG. 8B illustrates a UE 102 (or, more generally, a wireless communication device) that according to other embodiments implements various functional means or units, e.g., via the processing circuitry (or processor(s) or one or more processors) 820 in FIG. 8A. As shown, these functional means or units implement the methods presented in FIGS. 6A-6F (other modules/units for doing so may not be explicitly shown). For instance, FIG. 8B shows that the UE 102 can include a transmission power determining module or unit 850 that can be configured to determine a transmission power for one or more transmissions to a network node 106, including but not limited to an RA preamble 112 transmission and/or the transmission of an RA connection request message 116. In addition, FIG. 8B shows that the UE 102 can include a transmitting module or unit 860, which can be configured to transmit the one or more transmissions to the network node 106 using the determined transmission power(s) determined in the transmission power determining module or unit 850.

Figure 9B:
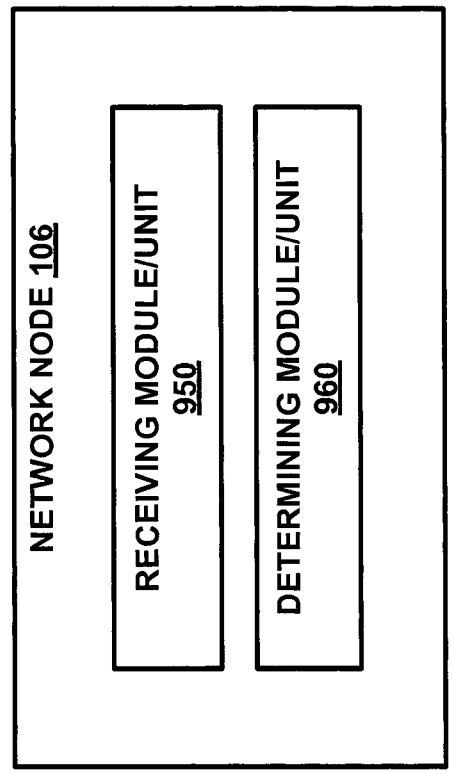
FIGS. 9A and 9B illustrate aspects of a network node in example embodiments of the present invention.
Figure 9A:
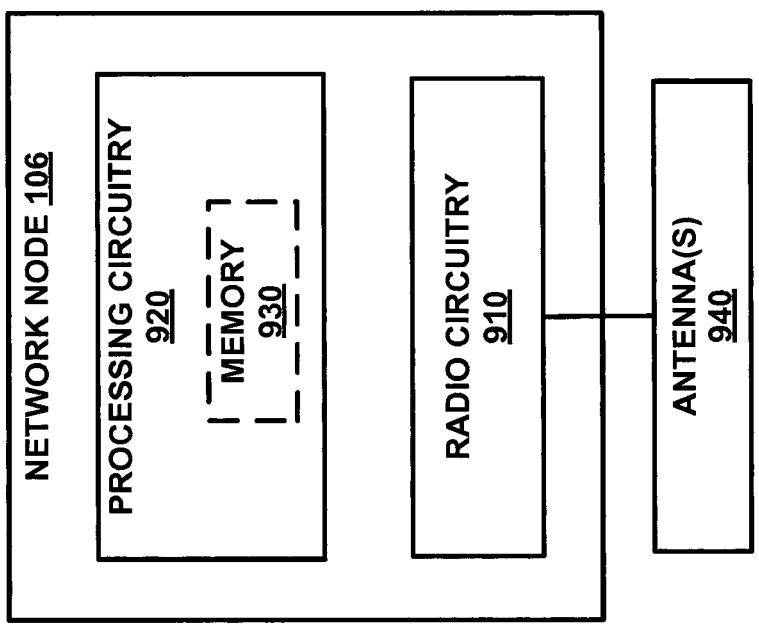

FIG. 9A illustrates additional details of a network node 106 (e.g., a network access device for a wireless communication network, such as a gNB, eNB, nodeB, base station, etc.) in accordance with one or more embodiments. As shown, the network node 106 includes processing circuitry 920 and radio circuitry 910. The radio circuitry 910 is configured to transmit via one or more antennas 940. The processing circuitry 920 is configured to perform processing described above, e.g., in FIG. 7, such as by executing instructions stored in memory 930. The processing circuitry 920 in this regard may implement certain functional means or units.

FIG. 9B illustrates network node 106 (e.g., a base station) that according to other embodiments implements various functional means or units, e.g., via the processing circuitry 920 in FIG. 9A. These functional means or units, e.g., for implementing the method in FIG. 7, include for instance a signal receiving module or unit 950 for receiving signaling from a UE 102, which can include a random access channel transmission or other signaling, such as those that may indicate information relevant to the communications between the UE 102 and network node 106, which may include a CE level of the UE 102, a number of repetitions the UE 102 will be using for transmissions, an indication that the UE 102 is or is not ramping transmission power or changing CE levels, among other possible control signaling. Also included may be a determining module or unit 960 for processing random access channel messages received from the UE 102 to determine information regarding RA transmissions originating from the UE 102.

Those skilled in the art will also appreciate that embodiments herein further include corresponding computer programs. A computer program comprises instructions which, when executed on at least one processor of equipment (e.g., UE or radio network equipment), cause the equipment to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium. In this regard, embodiments herein also include a computer program product stored on a non-transitory computer readable (storage or recording) medium and comprising instructions that, when executed by a processor of equipment, cause the equipment to perform as described above. Embodiments further include a computer program product comprising program code portions for performing the steps of any of the embodiments herein when the computer program product is executed by a computing device. This computer program product may be stored on a computer readable recording medium.

The example aspects of the disclosure presented below may be included in and/or may add features to one or more embodiments presented in the disclosure above. In some cases, the example aspects of the disclosure presented below form aspects of one or more embodiments that are at least partially distinct from the one or more embodiments presented above. In any case, this Appendix forms part of the present Application.

Figure 10:
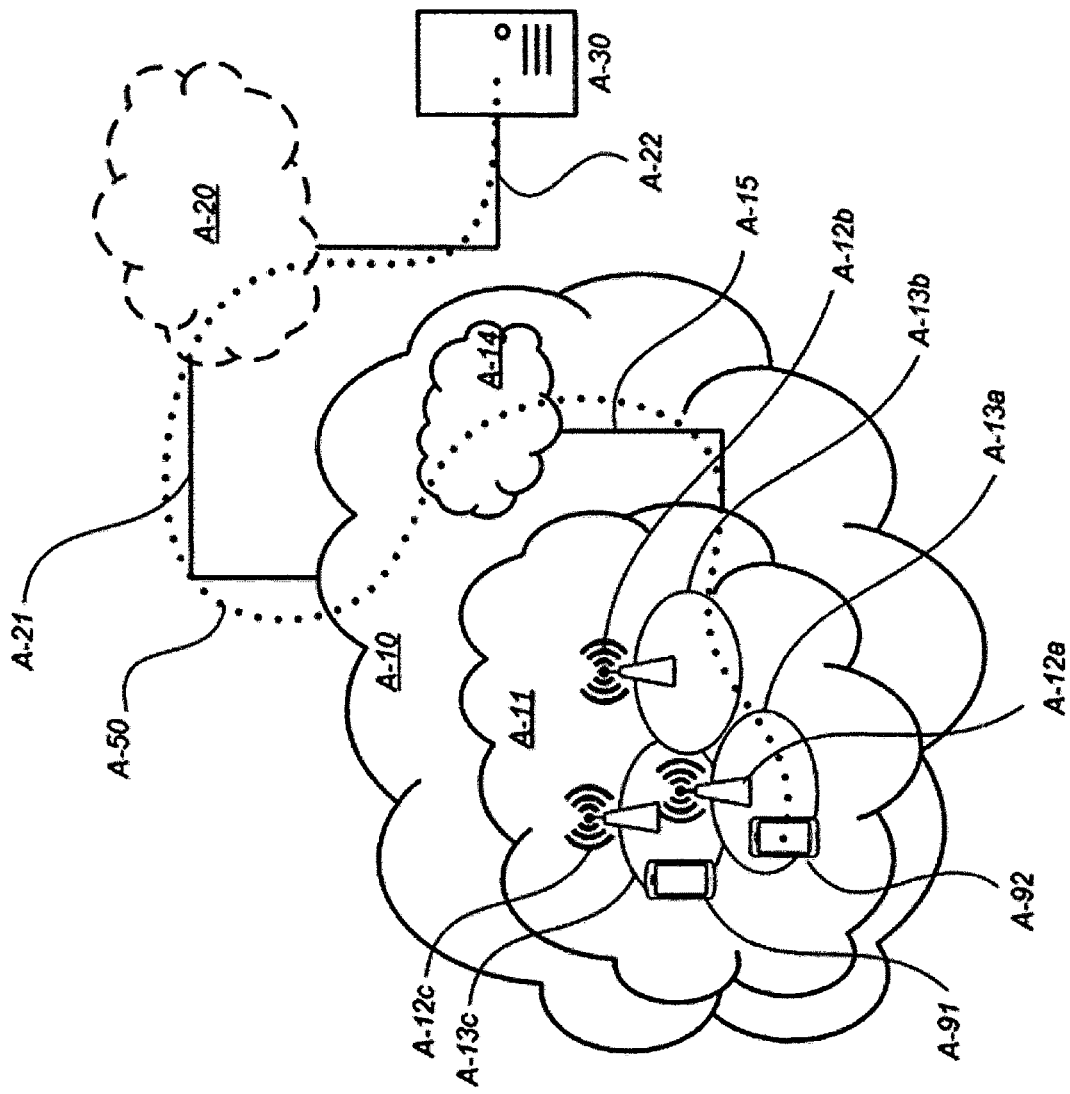
FIG. 10 schematically illustrates a telecommunication network connected via an intermediate network to a host computer.

FIG. 10 schematically illustrates a telecommunication network connected via an intermediate network to a host computer. With reference to FIG. 10, in accordance with an embodiment, a communication system includes a telecommunication network A-10, such as a 3GPP-type cellular network, which comprises an access network A-11, such as a radio access network, and a core network A-14. The access network A-11 comprises a plurality of base stations A-12a, A-12b, A-12c, such as NBs, eNBs, gNBs or other types of wireless access points (e.g. network nodes 106), each defining a corresponding coverage area A-13a, A-13b, A-13c. In an aspect, any of base stations A-12a, A-12b, A-12c, or any other base stations described herein may be considered to be a network node, for instance, if such as network node is described above in the present Application. Each base station A-12a, A-12b, A-12c is connectable to the core network A-14 over a wired or wireless connection A-15. A first user equipment (UE) A-91 (i.e. UE 102) located in coverage area A-13c is configured to wirelessly connect to, or be paged by, the corresponding base station A-12c. A second UE A-92 in coverage area A-13a is wirelessly connectable to the corresponding base station A-12a. While a plurality of UEs A-91, A-92 are illustrated in this example, the disclosed embodiments are equally applicable to a situation where a sole UE is in the coverage area or where a sole UE is connecting to the corresponding base station A-12. In an aspect, any of these UEs, or any other UE described herein may be considered to be configured to perform the aspects of any UE, user terminal, client device, or mobile device described above in the present Application.

The telecommunication network A-10 is itself connected to a host computer A-30, which may be embodied in the hardware and/or software of a standalone server, a cloud-implemented server, a distributed server or as processing resources in a server farm. The host computer A-30 may be under the ownership or control of a service provider, or may be operated by the service provider or on behalf of the service provider. The connections A-21, A-22 between the telecommunication network A-10 and the host computer A-30 may extend directly from the core network A-14 to the host computer A-30 or may go via an optional intermediate network A-20. The intermediate network A-20 may be one of, or a combination of more than one of, a public, private or hosted network; the intermediate network A-20, if any, may be a backbone network or the Internet; in particular, the intermediate network A-20 may comprise two or more sub-networks (not shown).

The communication system of FIG. 10 as a whole enables connectivity between one of the connected UEs A-91, A-92 and the host computer A-30. The connectivity may be described as an over-the-top (OTT) connection A-50. The host computer A-30 and the connected UEs A-91, A-92 are configured to communicate data and/or signaling via the OTT connection A-50, using the access network A-11, the core network A-14, any intermediate network A-20 and possible further infrastructure (not shown) as intermediaries. The OTT connection A-50 may be transparent in the sense that the participating communication devices through which the OTT connection A-50 passes are unaware of routing of uplink and downlink communications. For example, a base station A-12 may not or need not be informed about the past routing of an incoming downlink communication with data originating from a host computer A-30 to be forwarded (e.g., handed over) to a connected UE A-91. Similarly, the base station A-12 need not be aware of the future routing of an outgoing uplink communication originating from the UE A-91 towards the host computer A-30.

Figure 11:
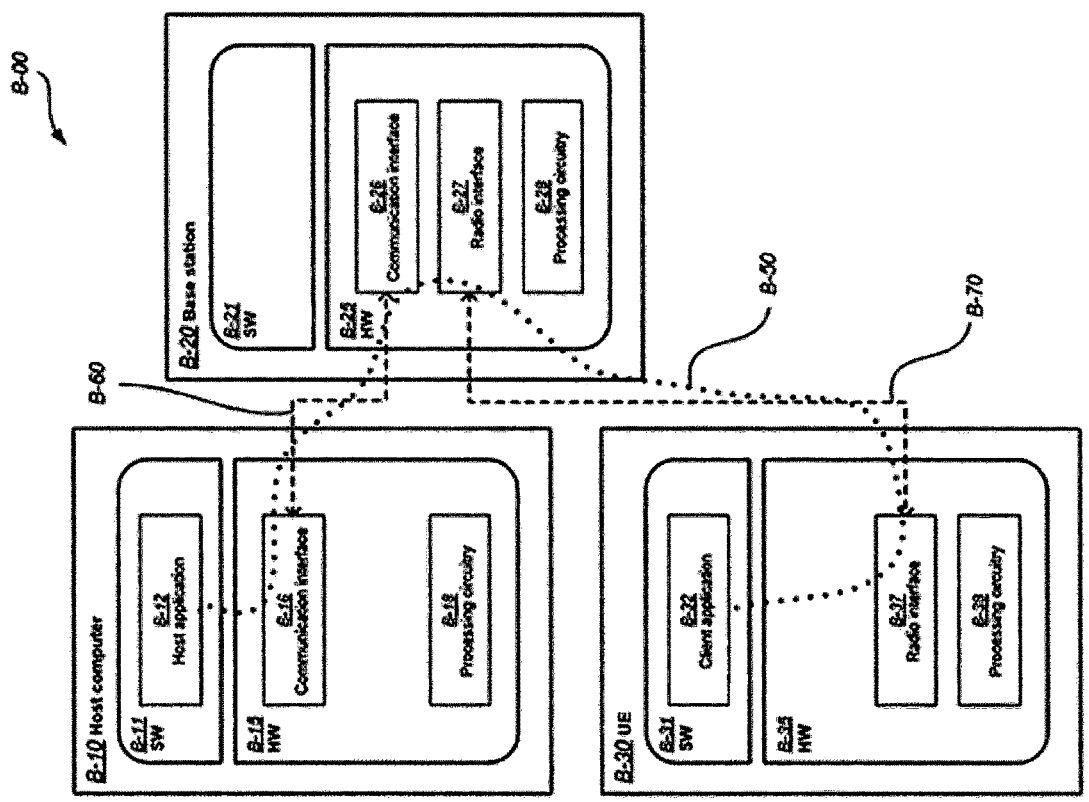

Example implementations, in accordance with an embodiment, of the UE, base station and host computer discussed in the preceding paragraphs will now be described with reference to FIG. 11, which is shown below. FIG. 11 is a generalized block diagram of a host computer communicating via a base station with a user equipment over a partially wireless connection.

In a communication system B-00, a host computer B-10 comprises hardware B-15 including a communication interface B-16 configured to set up and maintain a wired or wireless connection with an interface of a different communication device of the communication system B-00. The host computer B-10 further comprises processing circuitry B-18, which may have storage and/or processing capabilities. In particular, the processing circuitry B-18 may comprise one or more programmable processors, application-specific integrated circuits, field programmable gate arrays or combinations of these (not shown) adapted to execute instructions. The host computer B-10 further comprises software B-11, which is stored in or accessible by the host computer B-10 and executable by the processing circuitry B-18. The software B-11 includes a host application B-12. The host application B-12 may be operable to provide a service to a remote user, such as a UE B-30 connecting via an OTT connection B-50 terminating at the UE B-30 and the host computer B-10. In providing the service to the remote user, the host application B-12 may provide user data which is transmitted using the OTT connection B-50.

The communication system B-00 further includes a base station B-20 provided in a telecommunication system and comprising hardware B-25 enabling it to communicate with the host computer B-10 and with the UE B-30. The hardware B-25 may include a communication interface B-26 for setting up and maintaining a wired or wireless connection with an interface of a different communication device of the communication system B-00, as well as a radio interface B-27 for setting up and maintaining at least a wireless connection B-70 with a UE B-30 located in a coverage area (not shown in FIG. 11) served by the base station B-20. The communication interface B-26 may be configured to facilitate a connection B-60 to the host computer B-10. The connection B-60 may be direct or it may pass through a core network (not shown in FIG. 11) of the telecommunication system and/or through one or more intermediate networks outside the telecommunication system. In the embodiment shown, the hardware B-25 of the base station B-20 further includes processing circuitry B-28, which may comprise one or more programmable processors, application-specific integrated circuits, field programmable gate arrays or combinations of these (not shown) adapted to execute instructions. The base station B-20 further has software B-21 stored internally or accessible via an external connection.

The communication system B-00 further includes the UE B-30, which has already been referred to above. Its hardware B-35 may include a radio interface B-37 configured to set up and maintain a wireless connection B-70 with a base station serving a coverage area in which the UE B-30 is currently located. The hardware B-35 of the UE B-30 further includes processing circuitry B-38, which may comprise one or more programmable processors, application-specific integrated circuits, field programmable gate arrays or combinations of these (not shown) adapted to execute instructions. The UE B-30 further comprises software B-31, which is stored in or accessible by the UE B-30 and executable by the processing circuitry B-38.

The software B-31 includes a client application B-32. The client application B-32 may be operable to provide a service to a human or non-human user via the UE B-30, with the support of the host computer B-10. In the host computer B-10, an executing host application B-12 may communicate with the executing client application B-32 via the OTT connection B-50 terminating at the UE B-30 and the host computer B-10. In providing the service to the user, the client application B-32 may receive request data from the host application B-12 and provide user data in response to the request data. The OTT connection B-50 may transfer both the request data and the user data. The client application B-32 may interact with the user to generate the user data that it provides.

It is noted that the host computer B-10, base station B-20 and UE B-30 illustrated in FIG. 11 may be identical to the host computer A-30, one of the base stations A-12a, A-12b, A-12c and one of the UEs A-91, A-92 of FIG. 10, respectively. This is to say, the inner workings of these entities may be as shown in FIG. 10 and independently, the surrounding network topology may be that of FIG. 11.

In FIG. 11, the OTT connection B-50 has been drawn abstractly to illustrate the communication between the host computer B-10 and the use equipment B-30 via the base station B-20, without explicit reference to any intermediary devices and the precise routing of messages via these devices. Network infrastructure may determine the routing, which it may be configured to hide from the UE B-30 or from the service provider operating the host computer B-10, or both. While the OTT connection B-50 is active, the network infrastructure may further take decisions by which it dynamically changes the routing (e.g., on the basis of load balancing consideration or reconfiguration of the network).

The wireless connection B-70 between the UE B-30 and the base station B-20 is in accordance with the teachings of the embodiments described throughout this disclosure. One or more of the various embodiments improve the performance of OTT services provided to the UE B-30 using the OTT connection B-50, in which the wireless connection B-70 forms the last segment. More precisely, the teachings of these embodiments can improve one or more of data rate, latency, and/or power consumption associated with one or more devices and/or communications of/performed in communication system B-00, and thereby can provide benefits for OTT user data communication, such as one or more of reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring the OTT connection B-50 between the host computer B-10 and UE B-30, in response to variations in the measurement results. The measurement procedure and/or the network functionality for reconfiguring the OTT connection B-50 may be implemented in the software B-11 of the host computer B-10 or in the software B-31 of the UE B-30, or both.

In embodiments, sensors (not shown) may be deployed in or in association with communication devices through which the OTT connection B-50 passes; the sensors may participate in the measurement procedure by supplying values of the monitored quantities exemplified above, or supplying values of other physical quantities from which software B-11, B-31 may compute or estimate the monitored quantities. The reconfiguring of the OTT connection B-50 may include message format, retransmission settings, preferred routing etc.; the reconfiguring need not affect the base station B-20, and it may be unknown or imperceptible to the base station B-20.

Such procedures and functionalities may be known and practiced in the art. In certain embodiments, measurements may involve proprietary UE signaling facilitating the host computer's B-10 measurements of throughput, propagation times, latency and the like. The measurements may be implemented in that the software B-11, B-31 causes messages to be transmitted, in particular empty or 'dummy' messages, using the OTT connection B-50 while it monitors propagation times, errors etc.

FIGS. 12, 13, 14, and 15 (below) are flowcharts illustrating methods implemented in a communication system including a host computer, a base station and a user equipment.

Figure 12:
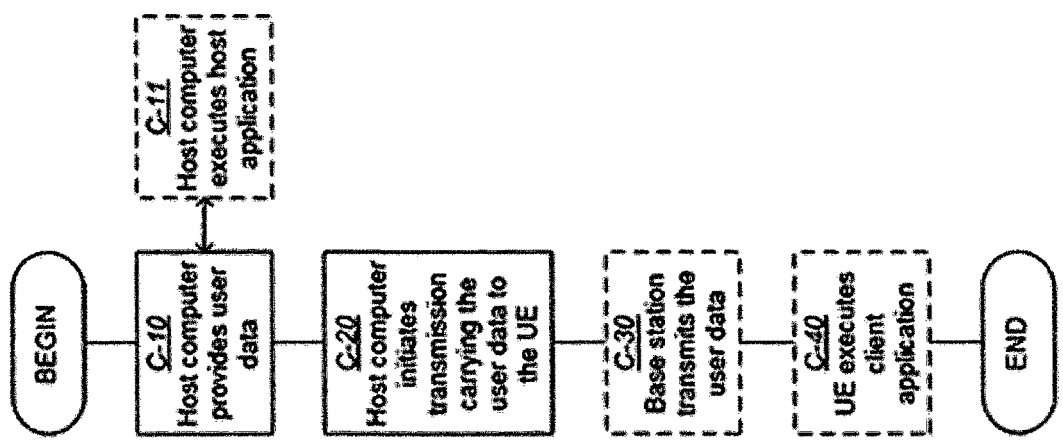
FIGS. 12, 13, 14, and 15 include flowcharts illustrating methods implemented in a communication system including a host computer, a base station and a user equipment.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In a first step C-10 of the method, the host computer provides user data.

In an optional substep C-11 of the first step C-10, the host computer provides the user data by executing a host application. In a second step C-20, the host computer initiates a transmission carrying the user data to the UE.

In an optional third step C-30, the base station transmits to the UE the user data which was carried in the transmission that the host computer initiated, in accordance with the teachings of the embodiments described throughout this disclosure. In an optional fourth step C-40, the UE executes a client application associated with the host application executed by the host computer.

Figure 13:
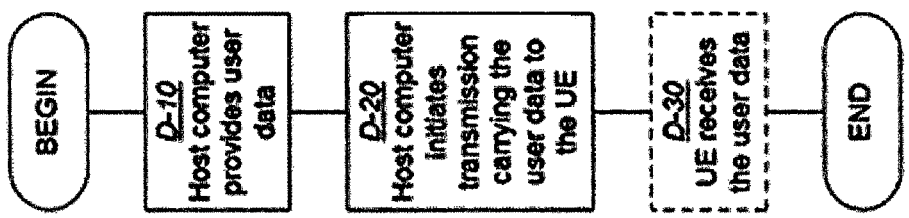

FIG. 13 is a flowchart illustrating a method implemented in a communication system, in accordance with one embodiment.

The communication system includes a host computer, a base station and a UE which may be those described with reference to FIGS. 10 and 11. For simplicity of the present disclosure, only drawing references to FIG. 13 will be included in this section. In a first step D-10 of the method, the host computer provides user data.

In an optional substep (not shown) the host computer provides the user data by executing a host application. In a second step D-20, the host computer initiates a transmission carrying the user data to the UE. The transmission may pass via the base station, in accordance with the teachings of the embodiments described throughout this disclosure. In an optional third step D-30, the UE receives the user data carried in the transmission.

Figure 14:
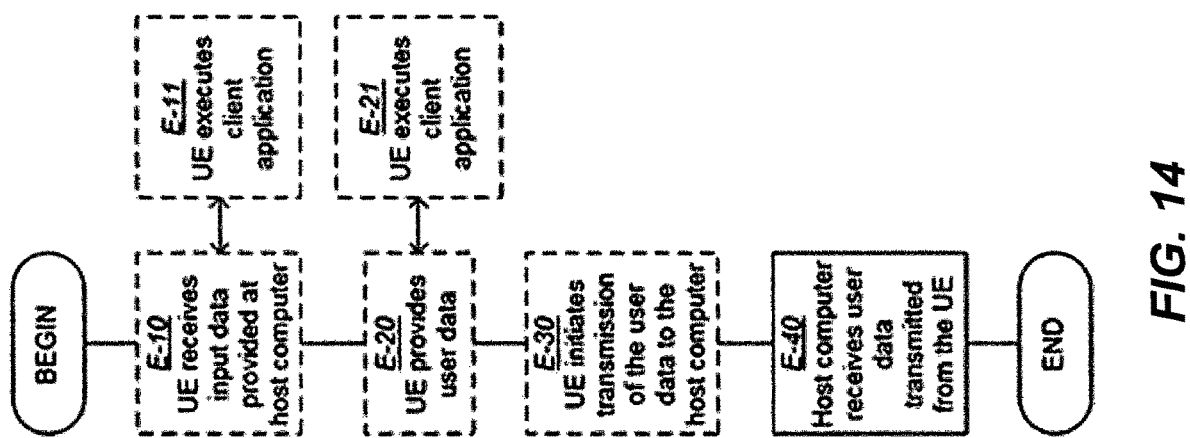

FIG. 14 is a flowchart illustrating a method implemented in a communication system, in accordance with one embodiment.

The communication system includes a host computer, a base station and a UE which may be those described with reference to FIGS. 10 and 11. For simplicity of the present disclosure, only drawing references to FIG. 14 will be included in this section. In an optional first step E-10 of the method, the UE receives input data provided by the host computer. Additionally or alternatively, in an optional second step E-20, the UE provides user data. In an optional substep E-21 of the second step E-20, the UE provides the user data by executing a client application. In a further optional substep E-11 of the first step E-10, the UE executes a client application which provides the user data in reaction to the received input data provided by the host computer. In providing the user data, the executed client application may further consider user input received from the user. Regardless of the specific manner in which the user data was provided, the UE initiates, in an optional third substep E-30, transmission of the user data to the host computer. In a fourth step E-40 of the method, the host computer receives the user data transmitted from the UE, in accordance with the teachings of the embodiments described throughout this disclosure.

Figure 15:
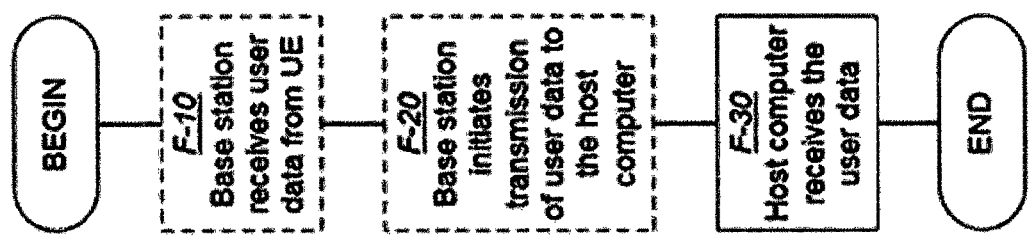

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In an optional first step F-10 of the method, in accordance with the teachings of the embodiments described throughout this disclosure, the base station receives user data from the UE. In an optional second step F-20, the base station initiates transmission of the received user data to the host computer. In a third step F-30, the host computer receives the user data carried in the transmission initiated by the base station.

ABBREVIATIONS

The following abbreviations, unless defined otherwise above, are defined by the explanations below as used in the present disclosure.

Abbreviation Explanation

ACK Acknowledgement
CE Coverage Enhancement
CL Coupling Loss
CLR Coupling Loss Reporting
DPR Data Volume and Power Headroom Report
IoT Internet of Things
MAC Medium Access Control
MCL Maximum Coupling Loss
Msg1 Message 1
Msg3 Message 3
NACK Negative Acknowledgement
NB-IoT narrow-band Internet of Things
NPDCCH NB-IoT Physical Downlink Control Channel
NPRACH NB-IoT Physical Random Access Channel
NPUSCH NB-IoT Physical Uplink Shared Channel
NRSRP NB-IoT Received Signal Received Power
PDU Protocol Data Unit
PHR Power Headroom Report
PL Path Loss
RRC Radio Resource Control
SINR Signal-to-Interference and Noise Ratio
UE User Equipment

The invention claimed is:

1. A method, performed by a user equipment (UE), for performing a random access procedure in a wireless communication system, the method comprising:
 determining a transmission power with which the UE is to transmit a random access preamble while operating within a certain coverage enhancement level, wherein the transmission power is determined as a function of:
  a target receive power with which the random access preamble transmission is targeted to be received by a network node, wherein the target receive power is a function of a configured UE transmission power minus at least a path loss threshold for operating within the certain coverage enhancement level; and
  a path loss between the UE and the network node;
 transmitting the random access preamble using the determined transmission power while operating within the certain coverage enhancement level;
 determining another transmission power with which the UE is to transmit a connection request in the random access procedure, wherein the other transmission power is determined as a function of the target receive power with which the random access preamble transmission was targeted to be received; and
 transmitting the connection request using the determined other transmission power.

2. The method of claim 1, wherein the target receive power is a function of a configured UE transmission power minus at least the path loss threshold for operating within the certain coverage enhancement level and a defined shift, wherein the defined shift is an adjusting factor.

3. The method of claim 2, further comprising receiving signaling indicating the defined shift.

4. The method of claim 3, wherein the defined shift is associated with the certain coverage enhancement level.

5. The method of claim 1, further comprising selecting to transmit a random access transmission using the certain coverage enhancement level responsive to random access having failed using a different coverage enhancement level than the certain coverage enhancement level.

6. The method of claim 5, wherein the different coverage enhancement level is associated with fewer transmission repetitions and/or a lower transmission power relative than the certain coverage enhancement level.

7. The method of claim 5, wherein the different coverage enhancement level is associated with a greater number of transmission repetitions and/or a higher transmission power relative than the certain coverage enhancement level.

8. The method of claim 1, further comprising selecting to transmit a random access transmission using the certain coverage enhancement level even though the path loss between the UE and the network node as experienced by the UE is lower than the path loss threshold for operating within the certain coverage enhancement level.

9. The method of claim 1, wherein the random access preamble transmission comprises a set of random access preambles that indicate that random access preamble transmission failed using a different coverage enhancement level than the certain coverage enhancement level.

10. The method of claim 9, wherein the different coverage enhancement level is associated with fewer transmission repetitions and/or a lower transmission power relative than the certain coverage enhancement level.

11. A User Equipment (UE) for performing a random access procedure in a wireless communication system, the UE comprising:
 processing circuitry;
 memory containing instructions executable by the processing circuitry whereby the UE is operative to:
  determine a transmission power with which the UE is to transmit a random access preamble while operating within a certain coverage enhancement level, wherein the transmission power is determined as a function of:
   a target receive power with which the random access preamble transmission is targeted to be received by a network node, wherein the target receive power is a function of a configured UE transmission power minus at least a path loss threshold for operating within the certain coverage enhancement level, and a path loss between the UE and a network node;

transmit the random access preamble using the determined transmission power while operating within the certain coverage enhancement level;

determine another transmission power with which the UE is to transmit a connection request in the random access procedure, wherein the other transmission power is determined as a function of the target receive power with which the random access preamble transmission was targeted to be received; and transmit the connection request using the determined other transmission power.

12. The method of claim 1, wherein the transmission power is computed according to:

$$P_{NPRACH} = \min\{P_{CMAX}, \text{TRP} + PL_c\}$$

where:

TRP is the target receive power for the network node calculated as $P_{CMAX,c} - CL_{CE,Th,X}$;

$P_{CMAX,c}$ is the configured UE transmission power, $CL_{CE,Th,X}$ is the path loss threshold for coverage level X; and $PL_c$ is an estimate of the path loss between the UE and the network node.

* * * * *